Feb. 13, 1962  R. M. HAYES ETAL  3,021,005
CARD PROCESSING SYSTEM
Filed Nov. 26, 1957  11 Sheets-Sheet 2

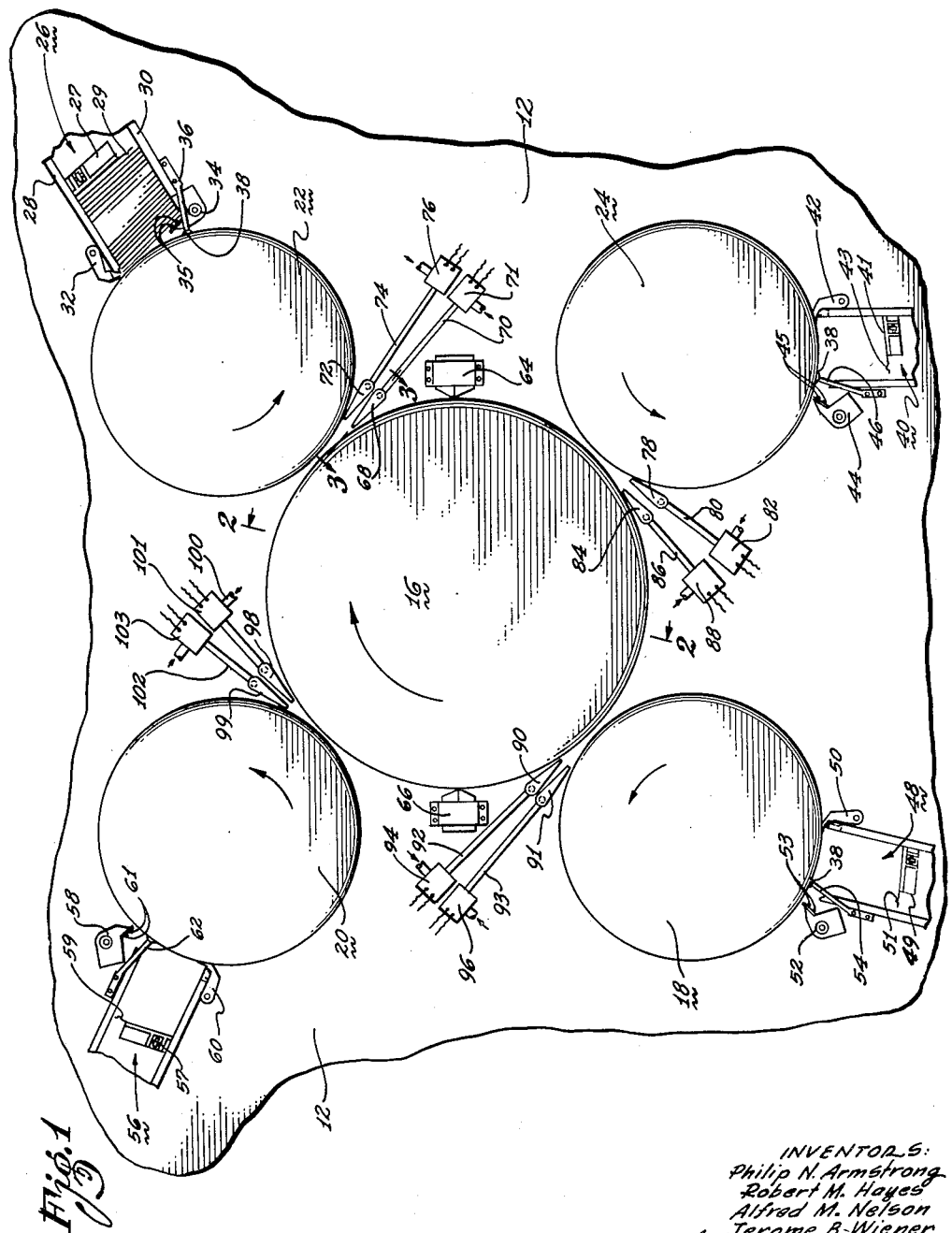

INVENTORS:
Philip N. Armstrong
Robert M. Hayes
Alfred M. Nelson
Jerome B. Wiener By Smyth & Roston
Attorneys

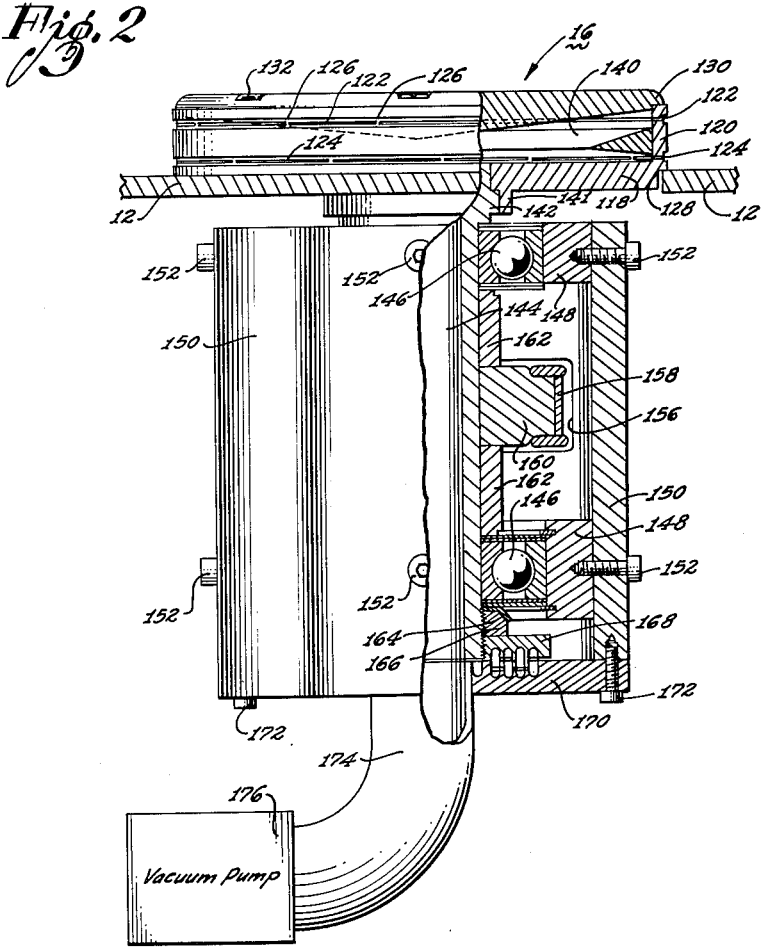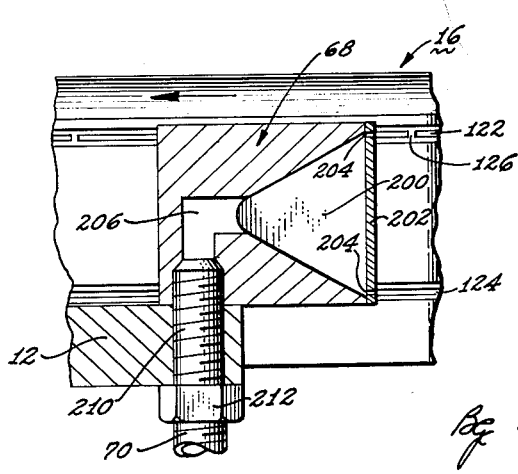

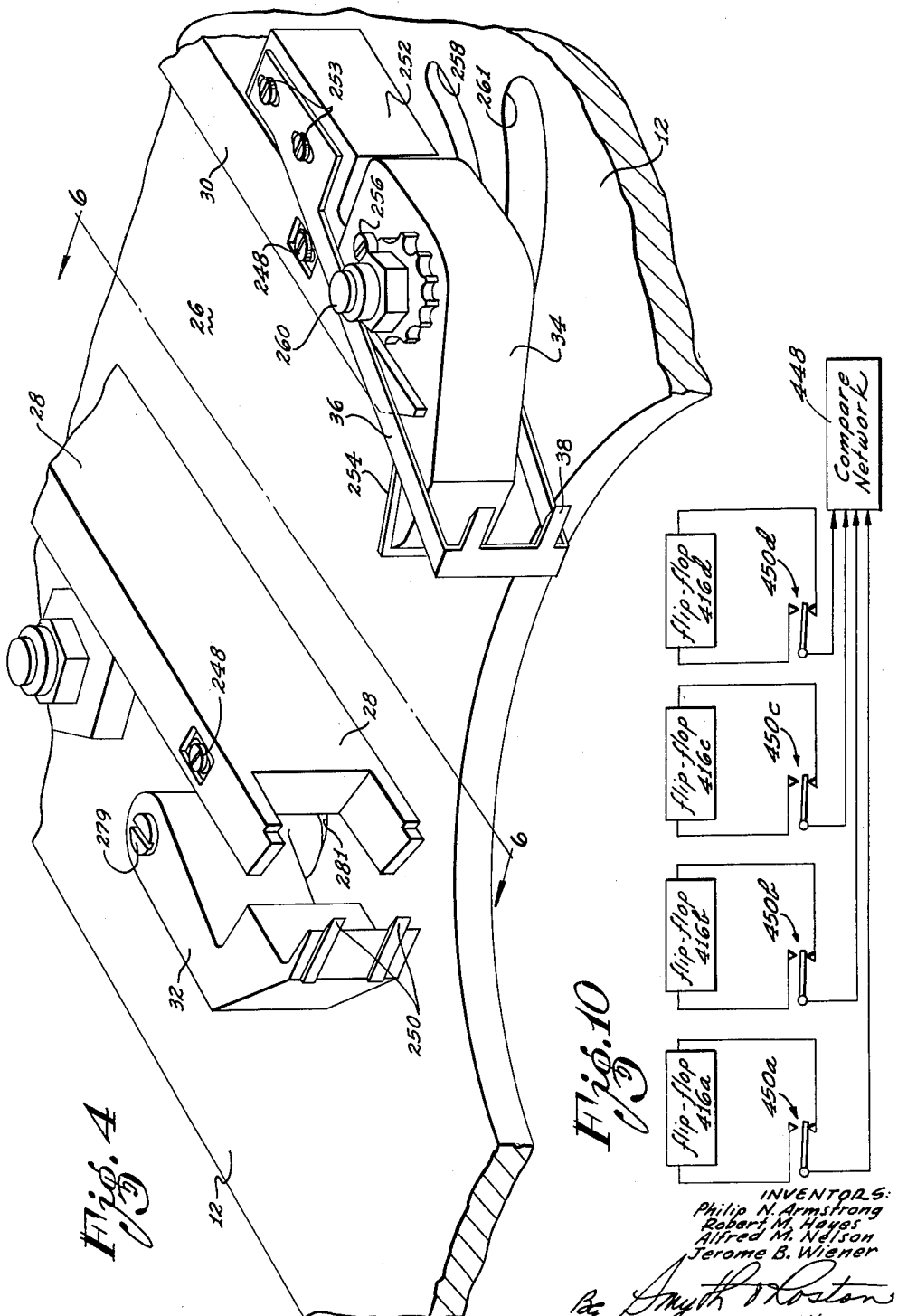

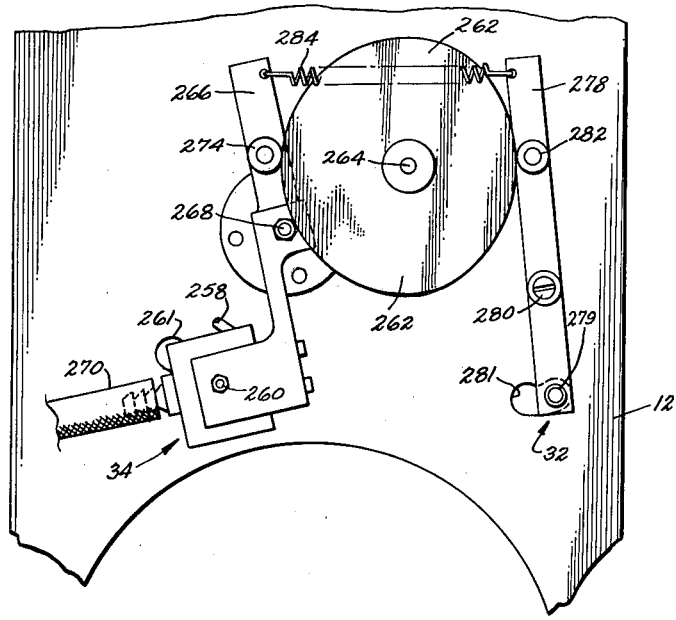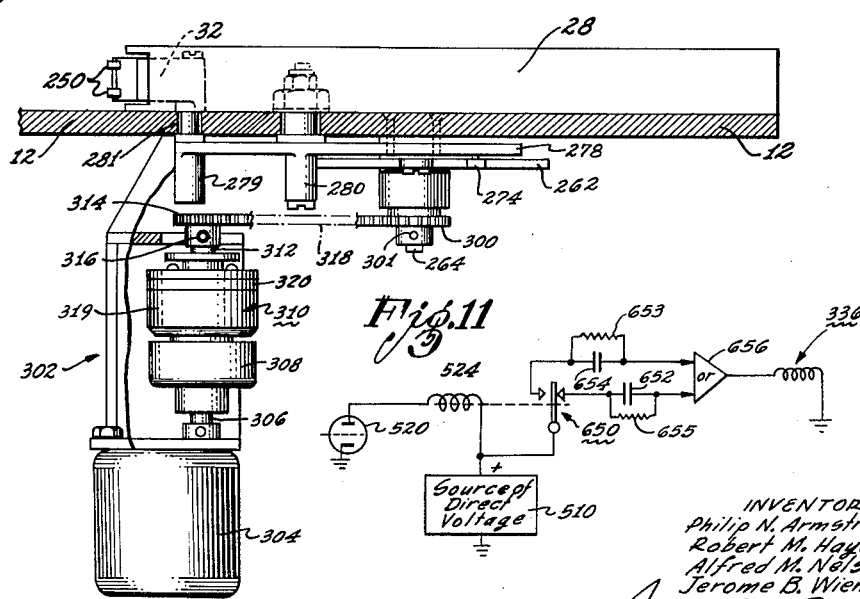

Feb. 13, 1962 R. M. HAYES ETAL 3,021,005
CARD PROCESSING SYSTEM
Filed Nov. 26, 1957 11 Sheets-Sheet 6

INVENTORS:
Philip N. Armstrong
Robert M. Hayes
Alfred M. Nelson
Jerome B. Wiener By Smyth & Roston
Attorneys,

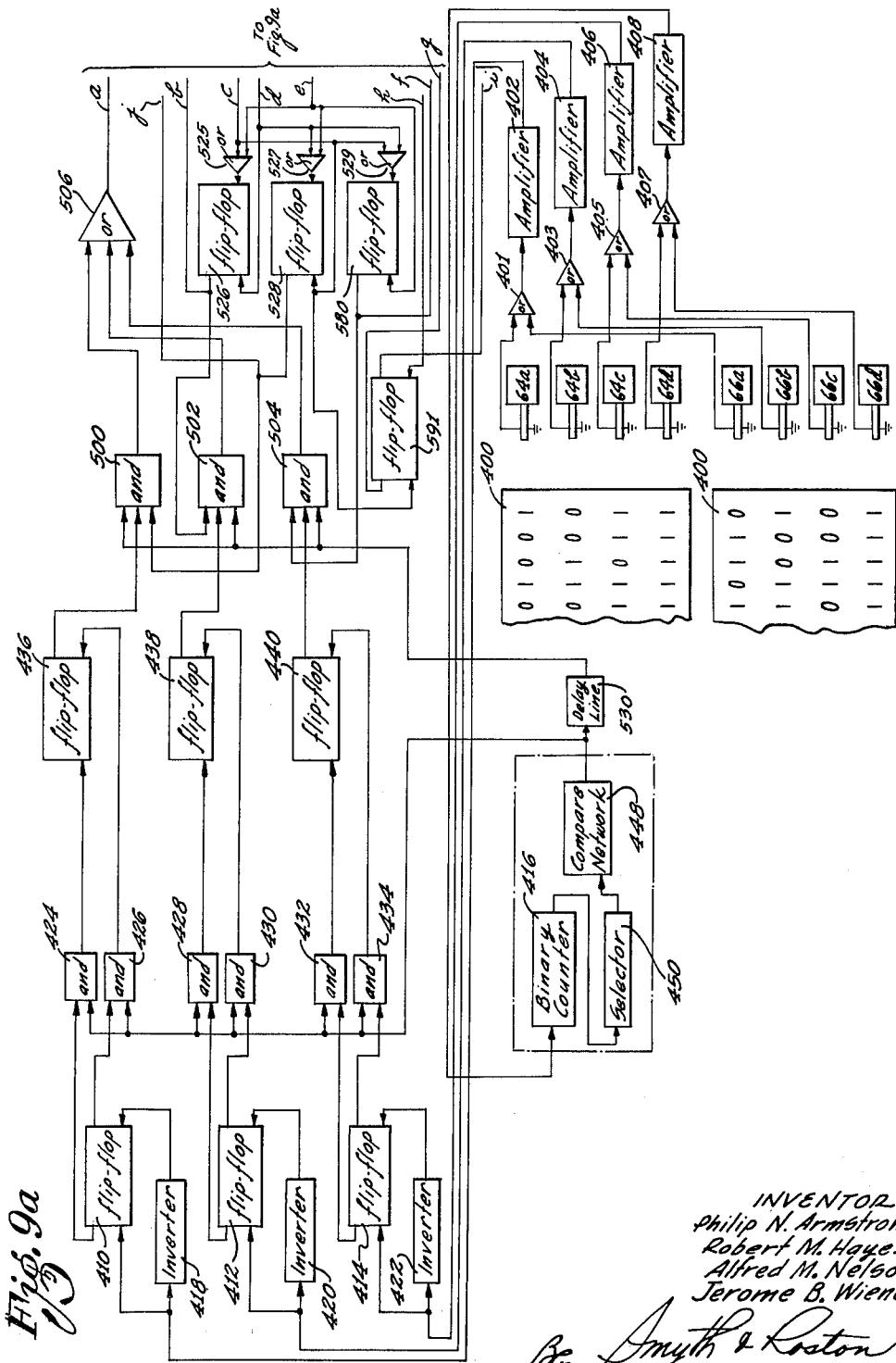

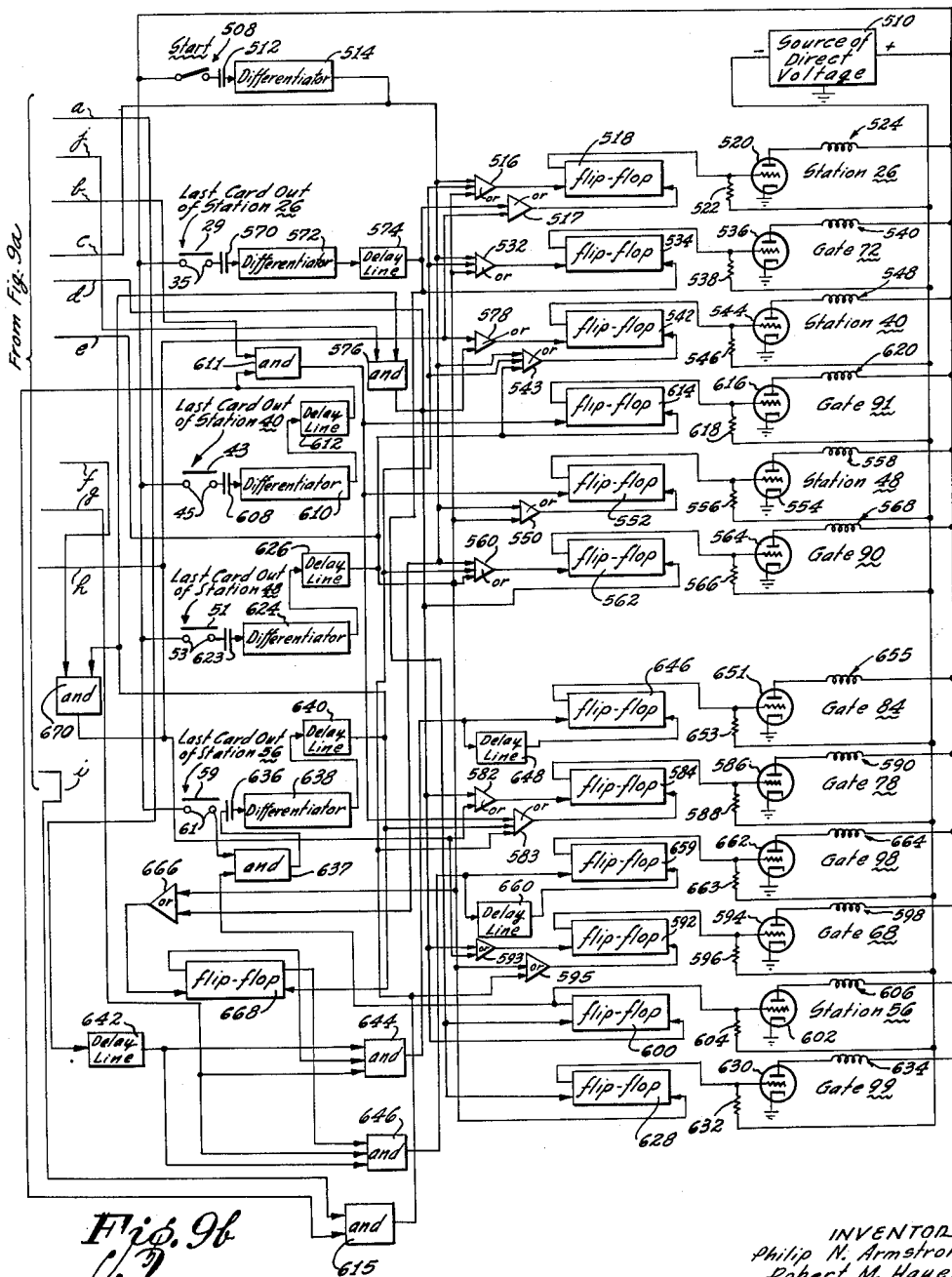

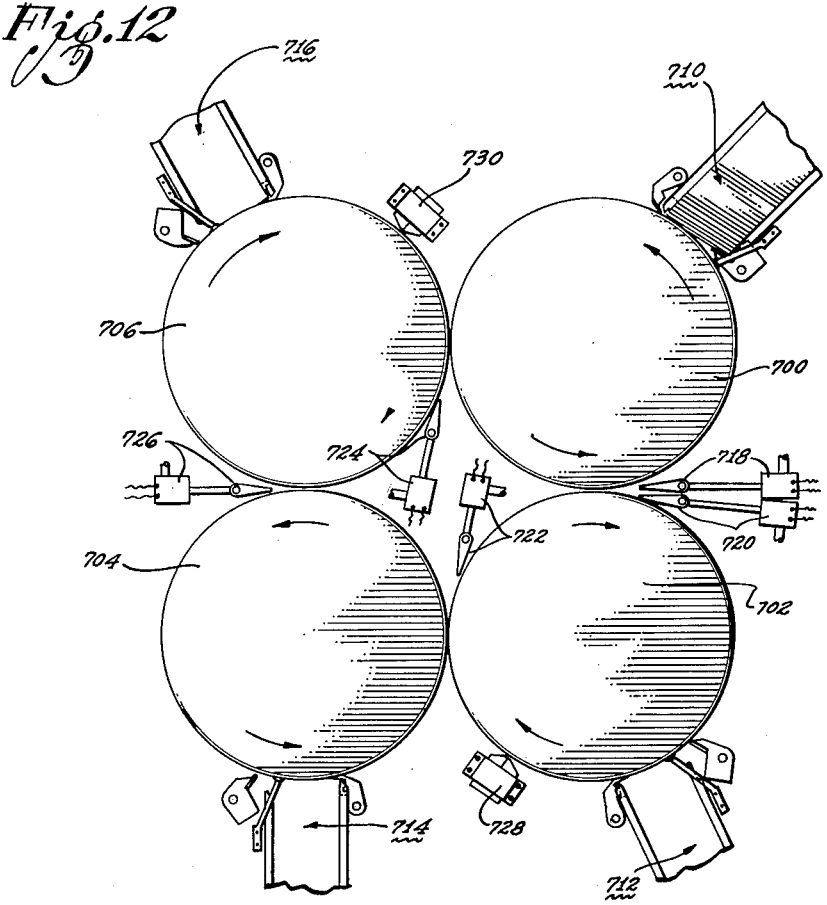

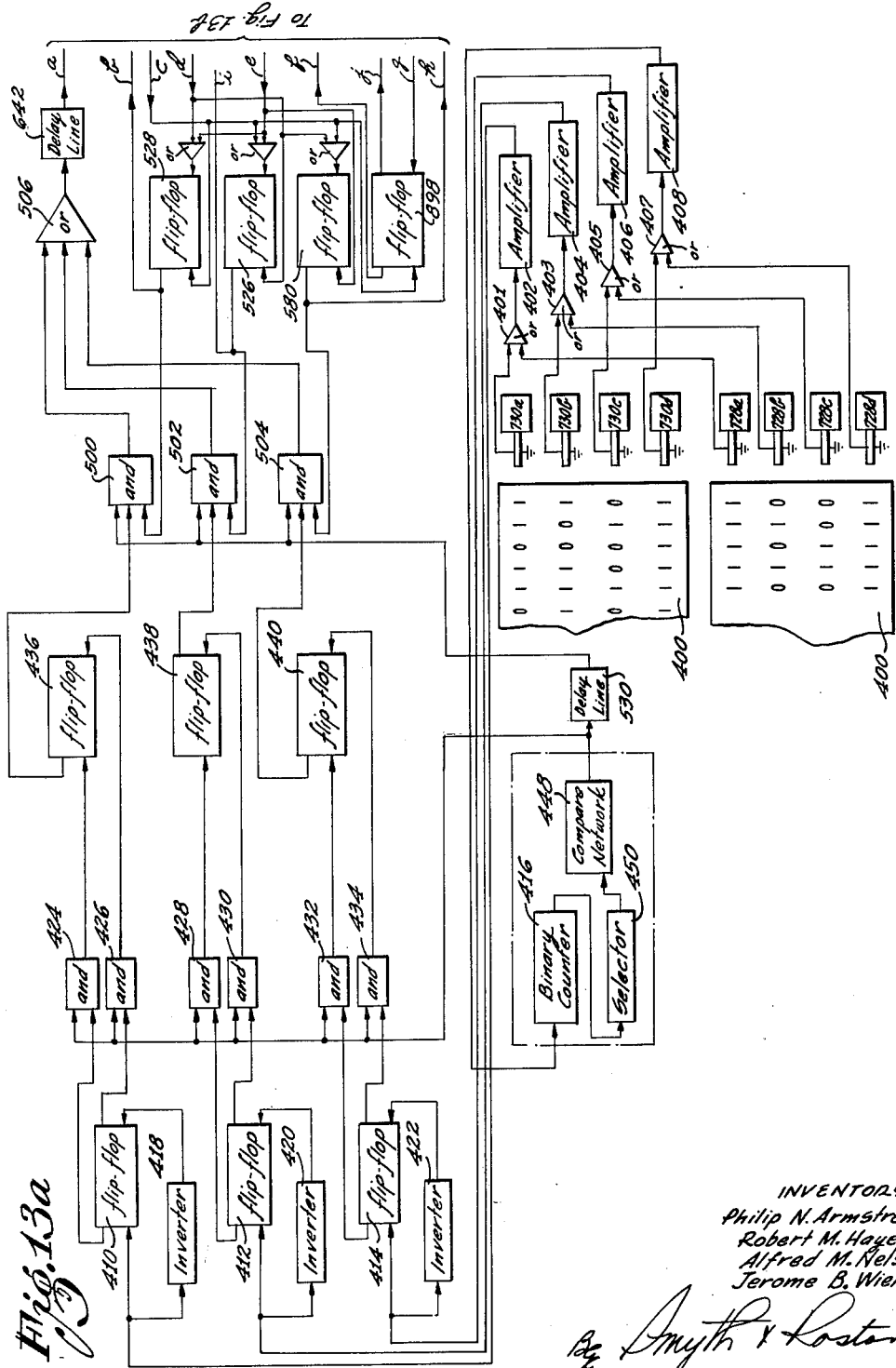

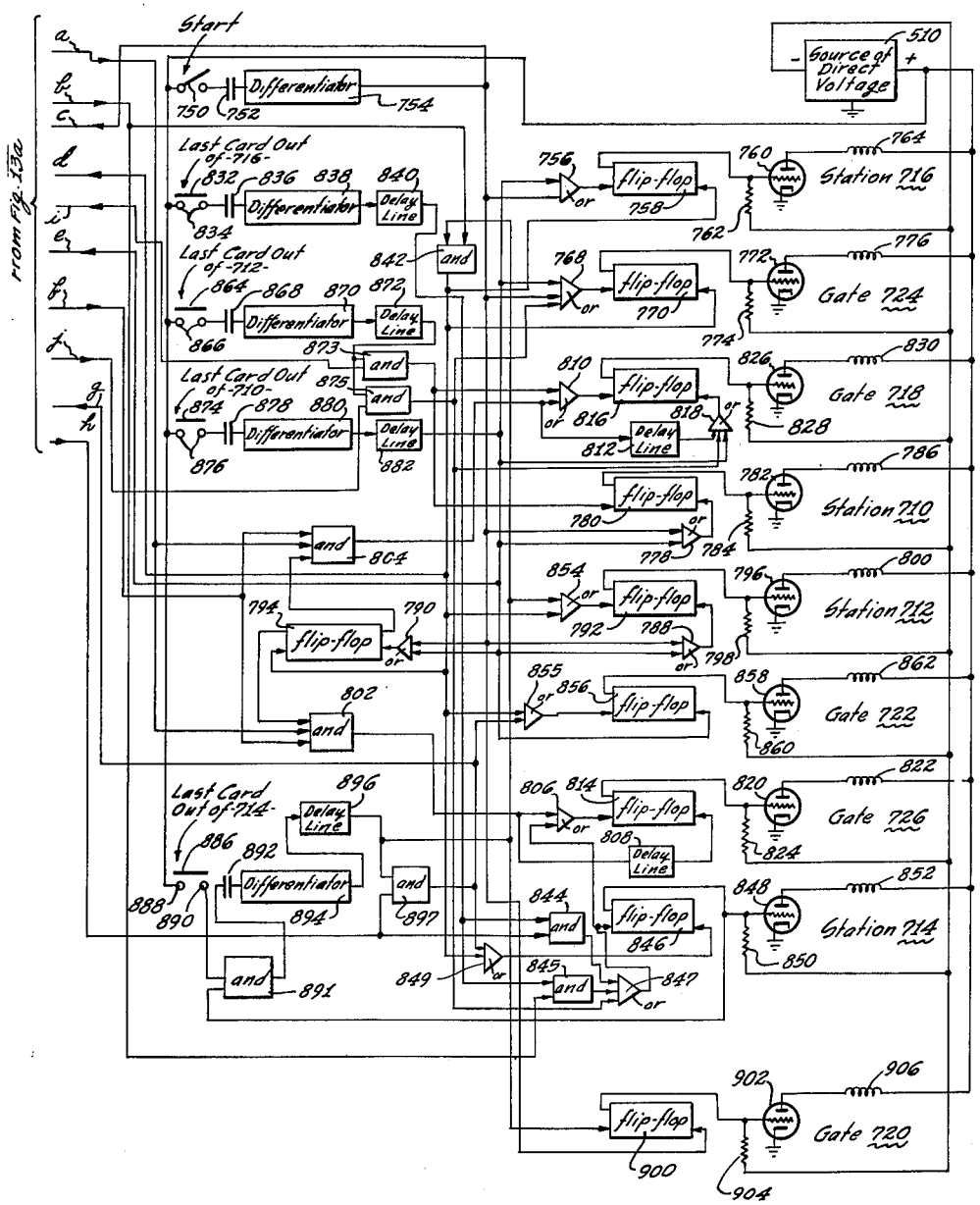

United States Patent Office 3,021,005
Patented Feb. 13, 1962

3,021,005
CARD PROCESSING SYSTEM
Robert M. Hayes, Los Angeles, Alfred M. Nelson, Redondo Beach, Jerome B. Wiener, Granada Hills, and Philip N. Armstrong, Santa Monica, Calif., assignors to The Magnavox Company, Los Angeles, Calif., a corporation of Delaware
Filed Nov. 26, 1957, Ser. No. 699,132
17 Claims. (Cl. 209—72)

The present system relates to data processing systems of the type using a plurality of separate information cards to store binary data. The invention is more particularly concerned with an improved system and apparatus for sorting or otherwise arranging such cards in a desired sequence. The desired sequence may be predicated upon the binary data recorded at any selected position on the individual cards, or it may be in accordance with multi-digital numbers or coded information represented by the binary data at a plurality of such positions.

The binary data referred to in the preceding paragraph may conveniently ber ecorded on the cards in the form of individual magnetic dots or areas of one polarity for a unity bit and of the other polarity for the zero bit. These dots are conveniently arranged in a series of regular rows extending across each card.

It is also usual to provide a clock row of magnetic dots on each card of a single polarity and extending lengthwise along the card. Each dot in this row corresponds to a different position of the card being processed. These clock dots are useful, as will be observed, in providing convenient electrical signals for controlling the cards and for selecting the particular position at which the cards are to be processed.

Although the use of magnetic areas for recording the binary data on the individual cards is preferred at present, and although the illustrated embodiment of the invention will be described in conjunction with such a type of recording, it will become evident as the present description proceeds that other recording techniques can be used. For example, the data may be recorded on the individual cards in the form of punched holes; with the presence of a hole representing, for example, a "zero" bit and the absence of a hole representing a "unity" bit. Also, photographic markings such as opaque markings and the like may be used for recording the data on the cards. The only material difference in the system of the invention as applied to cards using different ones of these various recording methods is in the transducer means which is used to scan the cards and to transform their recordings into electrical signals.

It is often required in present day data processing systems that the card utilized in the particular system be sorted, collated or otherwise processed in accordance with the binary information on the various cards. For example, should this binary information be representative of a numeric code, the processing should be carried out with respect to numerical sequences wherein processing of numerical information of progressive significance occurs in successive passes. Alternately, if the binary data represents an alphabetic code, the processing should occur in successive passes to indicate progressive letters in the alphabet in an order related to the disposition of the letters in the alphabet.

Because the cards in most systems represent different information at different positions or groups of positions of each card, the system of the invention is capable of responding to the information or data at a selected position of each card and of processing the cards with respect to that position. For example, if each position on a card represents a different letter of a person's name, successive groups of passes of the system starting with the last letter in the name and with each group of passes directed to a succeeding letter of increased significance will result in all the cards being processed into alphabetical order in accordance with the person's names represented by them. In like manner, the cards may be numerically processed when different digits of progressive ordinal significance are recorded at displaced positions on each card. Such displaced positions may be adjacent in the simplest form or they may be in any other relationship on the card dependent upon the disposition of the different transducer heads for processing the information on the cards.

The processing is carried out by the system of the invention for sorting purposes, for example, by reading the least significant binary bit on each card in a first pass and by depositing the "zeros" in a first receiving station and the "ones" in a second receiving station. For the next pass, the next significant bit is examined, and the cards in the first station and in the second station are now successively read. The "zeros" for the next significant bit are now placed in a third station and the "ones" for that bit are placed in a fourth station. The cards are then re-cycled in this manner between the four stations, with the bits of increasing significance being read in successive passes.

In this way, the stations in one pair serve as input means in alternate passes of the cards to provide a release of the cards for processing and the stations in the other pair serve as output means to receive the cards in accordance with the processing of the cards in these alternate passes. In the other passes, the stations in the second pair serve as the input means and the stations in the first pair serve as the output means to process the cards. By providing such an arrangement, the cards are processed in a minimum amount of time since there is no dead time between the end of each pass and the beginning of the next pass.

The invention will be described in conjunction with sorting of the cards in the manner described above. It will become apparent, however, as the description proceeds that equivalent systems may be used for collating or otherwise processing the cards.

In the drawings:

FIGURE 1 is a top plan view of one embodiment of the system and apparatus of the invention, this view showing in diagramamtic form a central vacuum pressure rotatable transporting drum and a group of auxiliary vacuum pressure transporting drums positioned adjacent the central drum, these drums serving to transport cards between a plurality of reversible stations for carrying out the purposes of the present invention;

FIGURE 1a somewhat schematically illustrates the operation of the system shown in FIGURE 1 in sorting the order of the cards in accordance with information processed on the cards in successive passes;

FIGURE 2 is a sectional view substantially on the line 2—2 of FIGURE 1, and this view shows a section of one of the vacuum pressure rotatable transporting drums of FIGURE 1 to particularly illustrate the constructional details of the drums;

FIGURE 3 is a sectional view, substantially on the line 3—3 of FIGURE 1, showing on an enlarged scale the details of a gate transfer mechanism that is used for obtaining the transfer of information cards from a first rotatable drum in a contiguous pair to the other drum in the pair;

Figure 14:
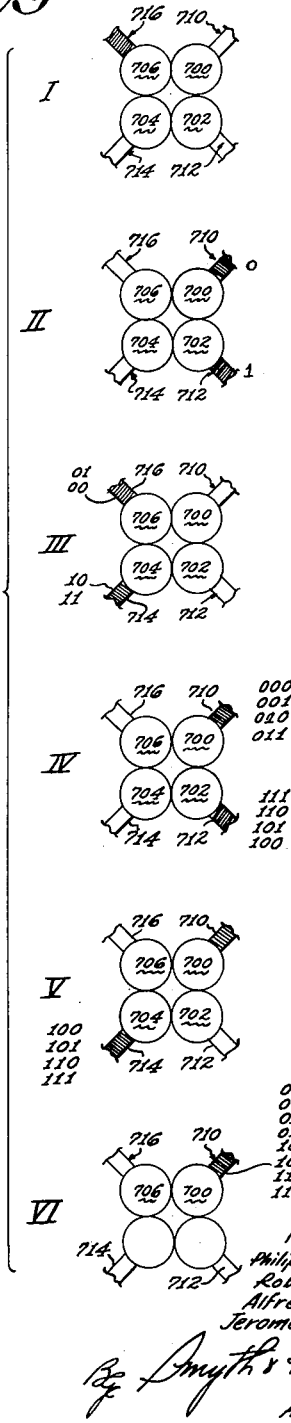
Figure 7:
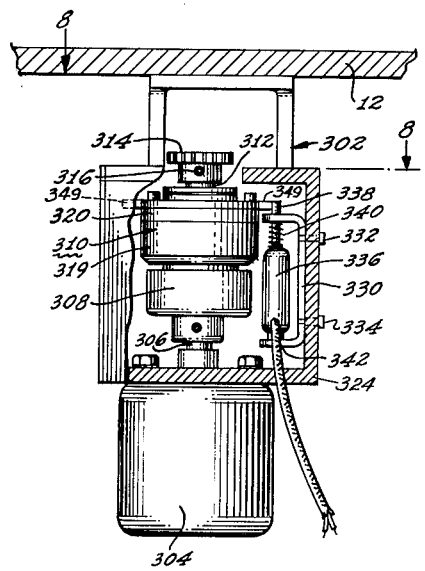
Figure 8:
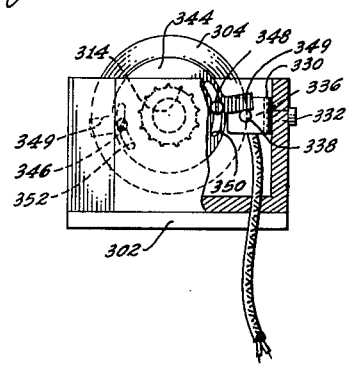

FIGURE 4 is a perspective view, on an enlarged scale with respect to FIGURE 1, showing a transfer mechanism that may be associated with any of the reversible stations of FIGURE 1, this transfer mechanism being controllable to feed information cards in sequence from its associated station to the periphery of the adjacent transporting drum or, alternately, to cause cards to be removed in sequence from the adjacent drum and be deposited in that particular station;

FIGURE 5 is a bottom view of the reversible station and transfer mechanism of FIGURE 4, particularly illustrating a cam and lever arrangement for operating a stackhead and a feedhead in the transfer mechanism to condition its associated station to a feeding mode or to a stacking mode;

FIGURE 6 is a sectional view substantially on the line 6—6 of FIGURE 4 and further illustrates the reversible station and transfer mechanism of FIGURE 4 and particularly illustrates the construction and relative disposition of a convenient drive motor and chain drive for the cam of FIGURE 5;

FIGURE 7 is another view, partly in section, of the drive means for the cam of FIGURE 5, and this latter view particularly illustrates a clutch assembly for coupling the drive motor of FIGURE 6 to the cam of FIGURE 5, and this view also shows appropriate solenoid means for actuating the clutch;

FIGURE 8 is a partially sectional view taken substantially on the line 8—8 of FIGURE 7 to show further details of the clutch mechanism;

FIGURES 9a and 9b are representations, partly in block form, of an electronic system for controlling the apparatus shown in FIGURES 1-8 and for enabling that apparatus to process the information cards used in the system in accordance with the invention and as dictated by binary data recorded on the cards;

FIGURE 10 is a more detailed representation of a selector system used in the control system of FIGURE 9;

FIGURE 11 is a circuit diagram of a local control system for the individual transfer mechanisms of the various reversible stations of the apparatus and system of FIGURE 1;

FIGURE 12 is a diagrammatic top plan view of a second embodiment of the invention, this latter view showing a system in which the central drum of the embodiment of FIGURE 1 is dispensed with, and in which adequate and efficient processing to carry out the objectives of the invention is achieved without the need for such a central drum;

FIGURES 13a and 13b are representations, partly in block form, of an electronic system for controlling the operation of the apparatus of FIGURE 12; and FIGURE 14 somewhat schematically illustrates the operation of the system shown in FIGURES 12 and 13 in sorting the order of the cards in accordance with the information processed on the cards in successive passes.

The embodiment of the invention shown in FIGURE 1 includes suitable transport means such as a central vacuum pressure rotatable transporting drum 16 which is rotatably mounted on a supporting surface such as a table top 12. A group of transport means such as four auxiliary vacuum pressure rotatable drums 18, 20, 22 and 24 are also mounted on the table top 12 adjacent the central drum 16 and in contiguous relationship with that drum. The drum 16 is shown by an arrow in FIGURE 1 as being rotatable in a clockwise direction and the drums 18, 20, 22 and 24 are shown by arrow as being rotatable in a counterclockwise direction. However, it should be appreciated that the drums may be rotatable in opposite directions to those shown. Actually, the drums may be rotatable in the same directions by using the bridging members disclosed and claimed in co-pending application, Serial No. 614,686, filed October 8, 1956 by Jerome B. Wiener et al., now Patent No. 2,985,299. The central drum and the auxiliary drums are constructed to exert a vacuum pressure at their peripheral edges. This vacuum pressure enables the information cards which are used in the system to be firmly supported on those edges for transportation by the drums. The drums are spaced apart at their contiguous points sufficiently so as not to interfere with the cards transported on their peripheral edges. All of the drums may be of essentially the same construction, and for that reason only the constructional details of the drum 16 will be discussed in conjunction with FIGURE 2. Although the drum 16 is shown as being larger than the other drums, it may be of the same size as the other drums and may actually be smaller than the other drums.

The system includes a first reversible feeding-stacking station 26 which is positioned on the table top 12 with its mouth placed adjacent the periphery of the auxiliary drum 22. The station 26 includes a pair of spaced parallel walls 28 and 30 which are secured to the table top 12 in a manner to be more fully described in conjunction with FIGURE 4. This station is adapted to support information cards in a stacked condition in which the lower edge of the cards rest on the table top and in which the cards are disposed between the parallel walls 28 and 30 in substantially perpendicular relationship to the table top 12.

A transfer mechanism or reversible means is included in the station 26, and this mechanism may be of the type described and claimed in co-pending application Ser. No. 645,639, filed March 12, 1957, in the name of Alfred M. Nelson et al., now Patent No. 2,969,979. The transfer mechanism will be described with more particularity subsequently in conjunction with FIGURE 4. The mechanism includes a stackhead 32 and a feedhead 34. The stackhead is positioned adjacent the trailing wall 28 of the station 26, and it is movable from its illustrated standby position to a position in which it fills the space between the end of the wall 28 and the periphery of the drum 22. The end of this wall is spaced from the periphery of the drum a distance sufficient to allow cards supported on that periphery to pass by the mouth of the station 26.

The station 26 is shown in its feeding mode with the feedhead 34 in its operative position. In this position, the feedhead extends through a bifurcated end portion of the trailing wall 30 to present a supporting surface for the leading card in the station. In a manner to be described, a controllable vacuum pressure is introduced to this supporting surface of the feedhead to control the release of cards from the station 26.

The station 26 also includes a lifter assembly 36. This assembly is secured to the table top 12 and it is positioned adjacent the trailing wall 30 of the station. The lifter has a hollow rectangular portion that extends diagonally across the trailing wall 30 and this portion terminates at the periphery of the drum 22. A series of pawls 38 are supported at the end of the rectangular portion of the lifter 36, and these pawls are contiguous to the periphery of the drum 22 and have bulged central portions that project radially outward from that periphery.

The stackhead 32 is illustrated in its standby position. When the station 26 is conditioned to its stacking mode, the stackhead 32 is moved to its operative position. Now, a card transported on the periphery of the drum 22 moves up over the pawls 38 and through the rectangular portion of the lifter 36. This particular card is then arrested by the stackhead. The pawls 38 are displaced angularly from the leading wall 28 of the station by a distance less than the length of the cards. Therefore, the trailing edge of the arrested card projects over the pawls 28. The next succeeding card then moves up under the arrested card, and this succeeding card transported by the drum 22 is also arrested by the stackhead 26 with its trailing edge projecting over the pawls 38. This succeeding card, however, causes the preceding arrested card to be deposited in the station 26. In this manner, and when the station 26 is so conditioned to its stacking mode, cards successively transported by the drum 22 move up over the pawls 38 and against the stackhead 32 to be deposited in proper order in the station 26.

While the station is conditioned to its stacking mode for the operations described above, the feedhead 34 is in its standby position and the stackhead 32 is in its operative position. As fully described in the copending application Ser. No. 645,639 referred to above, the feedhead 34 is coupled through a solenoid control valve to a vacuum source, and this head establishes a controllable vacuum pressure at its surface when it is moved forward to its operative position. For the latter operation, the stackhead 32 is retracted after the feedhead 34 has been moved into operative position. Upon the retraction of the stackhead 32, the station becomes conditioned to a feeding mode. By initially moving the feedhead 34 into position and subsequently retracting the stackhead 32, assurance is provided that no cards can be lost during the reversal in the operation of the station.

In a manner to be described, the stackhead 32 and the feedhead 34 are cam-operated so that one is moved to its operative position and the other is subsequently moved to its standby position and vice versa. When the feedhead is moved to its operative position, the cards are retained in the station 26 as long as a vacuum pressure is maintained at its surface. However, when this vacuum pressure is interrupted, the cards are withdrawn in a one-by-one sequence by the drum 22 and they are transported on the periphery of the drum past the end of the leading wall 28.

A similar reversible feeding-stacking station 40 is mounted on the table top 12 with its mouth adjacent the periphery of the auxiliary transporting drum 24. The station 40 may include a similar transfer mechanism or reversible means to the one described above in conjunction with the station 26. The transfer mechanism associated with the station 40 may include a stackhead 42 and a feedhead 44, together with a lifter assembly 46.

In like manner, a reversible feeding-stacking station 48 is associated with the auxiliary drum 18. The transfer mechanism associated with the station 48 includes a stackhead 50, a feedhead 52, and a lifter assembly 54. A similar reversible station 56 is mounted on the table top 12 and is positioned adjacent the auxiliary drum 20. The transfer mechanism associated with the station 56 includes a feedhead 58, a stackhead 60 and a lifter assembly 62.

The stations 40, 48 and 56 may all be similar in their construction to the station 26. For that reason, only the station 26 and its associated transfer mechanism are shown in FIGURE 4 and only these elements will be described in detail.

A series of transducer heads, indicated generally as 64, are mounted on the table top 12; and these heads are positioned in operative relationship with the periphery of the drum 16. This first group of heads is positioned on the table top to assume an angular position on the drum 16 which is interposed between the contiguous points of the drums 22 and 24 with the central drum 16. These heads may be electro-magnetic transducers, and they serve to process cards which are transported past them on the central drum 16. That is, in a manner to be described, the heads 64 scan the binary data recorded on the cards transported past them. The scanned data is introduced to certain means including electrical circuitry which process the scanned data and initiate certain control effects in accordance with the processed information.

A second group of transducer heads 66 are mounted on the table top 12. This latter group of heads is also disposed in operative relationship with the periphery of the drum 16 and has relative to the drum an angular position which is essentially diametrically opposite the heads 64. The latter group of heads 66 is positioned to lie between the positions at which the central drum 16 is contiguous to the drums 18 and 20.

There is sufficient spacing between the heads 64 and the periphery of the drum 16, and between the heads 66 and the periphery of the drum, to permit cards transported by the drum to pass freely between the drum and the faces of these heads. The heads 66 may also be electro-magnetic transducers, and they also serve to scan the binary data recorded on the information cards transported past them by the drum 16. This scanned data is introduced to means including electrical circuitry which process the scanned data and initiate control effects in a manner to be described in accordance with the processed information.

A first pneumatic gate transfer mechanism 68 is mounted on the table top 12, and this gate mechanism is positioned adjacent the periphery of the central drum 16 and at the contiguous point between this drum and the auxiliary drum 22. A feed line 70 couples the gate transfer mechanism to an appropriate air pressure source. Air from that source is introduced to the gate through a solenoid-actuated valve 71 which is included in the line 70. When the valve 71 is open, air from the pressure source passes through the gate 68 and emerges from the gate as high pressure streams. These streams are directed tangentially relative to the periphery of the drum 16, and they cause the leading end of a card transported by that drum and coming under the influence of the gate to be raised from the periphery of the drum 16. This brings the leading end of the card under the influence of the vacuum pressure at the periphery of the drum 22 and enables it to be transferred to the latter drum.

A second gate transfer mechanism 72 is mounted adjacent the periphery of the drum 22 at the point of contiguity between that drum and the central drum 16. A feed line 74 couples the latter gate to an appropriate pressure source, and a solenoid-actuated valve 76 is included in this feed line.

The constructional details of the gate transfer mechanism 72 and of those to be subsequently described may be similar to the gate 68. In each instance, the gate transfer mechanism is controlled to produce streams of high velocity air which are directed tangentially relative to the periphery of its associated drum to strip the cards from the associated drum and transfer such cards to the contiguous drum. Because these constructional details are similar for all the gate transfer mechanisms, only the gate 68 is shown in detail in FIGURE 3 and only the construction and operation of the gate 68 will be described in detail.

A gate-transfer mechanism 78 is positioned adjacent the periphery of the auxiliary drum 24 at its contiguous point with the central drum 16. A feed line 80 couples this gate to an appropriate air pressure source, and the supply of air pressure is controlled by a solenoid-actuated valve 82 in the feed line. When the valve 82 is open, the resulting air streams from the gate 78 obtain the transfer of cards from the drum 24 to the drum 16.

A gate transfer mechanism 84 is located at the contiguous point of the drums 16 and 24 to control the transfer of cards from the former drum to the latter. A feed line 86 couples the gate 84 to an air pressure source, and a solenoid-actuated valve 88 is included in the feed line.

A pair of gate-transfer mechanisms 90 and 91 are located at the position of contiguity between the drums 16 and 18. The gate 90 controls the transfer of cards from the drum 16 to the drum 18, and the gate 91 controls the transfer of cards from the drum 18 to the drum 16. A feed line 92 couples the gate 90 to an air-pressure source, and a feed line 93 couples the gate 91 to that source. A solenoid-actuated valve 94 is included in the feed line 92, and a solenoid-actuated valve 96 is included in the feed line 93.

Similarly, a pair of gate transfer mechanisms 98 and 99 are included in the system, and these latter gates are located at the position of contiguity between the drums 16 and 20. The gate 93 controls the transfer of cards from the drum 16 to the drum 20, and the gate 99 controls the transfer of cards from the drum 20 to the drum 16. A feed line 100 couples the gate 98 to the air-pressure source, and a solenoid-actuated valve 101 is included in that feed line. Likewise, a feed line 102 couples the gate 99 to the pressure source, and a solenoid-actuated valve 103 is included in the latter feed line.

In each instance, the gates are spaced sufficiently from the periphery of their associated drum so that in the absence of the emerging air streams, the cards transported on the related periphery may be moved freely past the particular gate transfer mechanism.

The drum 16 may be similar to the drum disclosed and claimed in copending application Ser. No. 600,975, which was filed July 30, 1956 for Loren R. Wilson, now Patent No. 2,883,189. As shown in detail in FIGURE 2, the drum 16 may be formed from a lower section and an upper section. The lower section of the drum includes a disk-like bottom portion 118 and an integral side portion 120. A pair of axially spaced peripheral orifices 122 and 124 extend through the side portion 120. Each of the peripheral orifices is discontinuous in that it is interrupted at selected intervals about its periphery by a plurality of posts 126 which are integral with the side portion 120.

The disk-like bottom portion 118 of the lower section of the drum is undercut as shown at 128 to have a reduced diameter with respect to the outer diameter of the annular side portion 120. This enables the table top 12 to extend beyond the outer limits of the side portion 120 so that the portion 120 overlaps the table top in the illustrated manner. Therefore, and as pointed out in the copending application Ser. No. 600,975, even without excessively close tolerances between the edge of the table top 12 and the rotating surface of the drum 16, the cards supported endwise on the table top in the various stations have no tendency to slip downwardly between the table and the drum to become misplaced or damaged.

The upper section of the drum 16 is in the form of a disk-like member 130 which engages the annular side member 120 of the lower section. The upper section 130 forms an enclosure with the lower section of the drum, with the upper section being parallel to the disk-shaped bottom portion 118 of the lower section. The upper section 130 is held in place by a series of screws 132.

A deflector ring 140 is supported within the interior of the drum 16 in pressed fit with the inner surface of the annular side portion 120. This deflector ring is tapered toward the center of the drum and it serves to prevent turbulence and to provide a streamlined path for air which is drawn inwardly through the orifices 122 and 124 to create a vacuum pressure at the outer surface of the portion 120. Moreover, the under surface of the upper section 130 is bulged to have a convex shape, and this also aids in providing a smooth path for the air drawn in through the orifices 122 and 124 so as to prevent turbulence.

The portion 118 of the lower section of the drum 16 contains a central opening surrounded by an annular collar 141. The collar 141 surrounds a collar 142 provided at one end of a hollow shaft 144. The drum 16 is supported on a shoulder formed by the collar 142 and the end of the shaft 144 extends into the opening of the portion 118 in friction fit with that portion. Therefore, rotation of the hollow shaft 144 causes the drum 16 to rotate. Also, the interior of the shaft 144 communicates with the interior of the drum.

Bearings 146 are provided at the opposite ends of the shaft 144. The inner races of the bearings 146 are mounted on the shaft 144, and the outer races of the bearings are disposed against bushings 148 secured to a housing 150 by studs 152. An arcuate opening 156 is provided in the housing 150 between the bearings 146. This opening enables a drive belt 158 to extend into the housing and around the pulley 160. The pulley is affixed to the shaft 144 between the bearings 146, and the pulley is held against axial movement by a pair of sleeves 162. In this manner, the shaft 144 and the drum 16 can be rotated by a suitable motor (not shown) coupled to the pulley 160 by a drive belt 158.

The bearings 146 and the sleeves 162 are held on the shaft 144 by a nut 166. The nut 166 is screwed on a threaded portion at the bottom of the shaft, and a lock washer 164 is interposed between the nut and the lower bearing. A sealing disk 168 is also screwed on the threaded portion at the bottom of the shaft 144. The sealing disk operates in conjunction with a bottom plate 170 to inhibit the movement of air between the interior of the housing 150 and the interior of the hollow shaft 144 when a pressure differential exists between these components.

The bottom plate 170 is mounted on the bottom of the housing 50 by a plurality of studs 172, and this bottom plate has a central circular opening. A hollow conduit 174 extends into the opening in the bottom plate in press-fit with the plate 170. The conduit 174 is axially aligned with the hollow shaft 144 so that air may be exhausted from the hollow interiors of the shaft and from the conduit by a vacuum pump 176. The vacuum pump 176 may be of any suitable known construction and, for that reason, is shown merely in block form.

The vacuum pump 176 draws air inwardly through the orifices 122 and 124, through the interior of the drum 16, downwardly through the shaft 144 and through the conduit 174. This creates a vacuum pressure at the outer peripheral surface of the annular portion 120 of the lower section of the drum 16. The deflector ring 140 and the convex underside of the disk-like upper section 130 operate to facilitate a smooth flow of air and a minimum of turbulence in the air. This enables a high and adequate vacuum pressure to be provided around the outer surface of the annular side portion 120 firmly to retain the transported cards on that surface.

The gate transfer mechanism 68 may be constructed in the manner shown in FIGURE 3 and, as noted above, the other gate transfer mechanisms 72, 78, 84, 90, 91, 98 and 99 may be similarly constructed.

As shown from the plan view of FIGURE 1, the gate 68 may have an essentially tear-drop configuration when viewed from the top or from the bottom. The gate includes a bell-shaped chamber 200 (FIGURE 3) extending into its interior from the narrow end of the gate adjacent the drum 16. An apertured plate 202 closes the narrow end of the gate 68 adjacent the periphery of the drum 16, and this plate has a pair of apertures 204 extending through it. The apertures 204 are respectively aligned with the annular orifices 122 and 124 in the drum 16.

A right-angled passageway 206 extends from the rear of the chamber 200 and down through the bottom of the gate. The feed line 70 is coupled to the passageway 206 through any suitable threaded fitting 210. This fitting extends through the table top 12, and it is threaded to the wall of the passageway 206. A nut 212 is threaded to the fitting 210, and the nut engages the lower side of the table top 12. The nut serves to retain the gate on the table top. This mounting permits the gate to be pivoted about the axis of the fitting 210 to the required position such that the air streams passing out the apertures 204 extend tangentially relative to the periphery of the drum 16.

The air pressure introduced to the gate transfer mechanism 68 through the feed line 70 emerges through the apertures 204 in the form of streams of high velocity. These streams are directed against the periphery of the drum 16, as noted above, and the gate is adjusted in the described manner so that the streams extend tangentially relative to the periphery of the drum 16 at a point adjacent the contiguous point of that drum with the drum 22. These streams counteract the vacuum pressure exerted through the orifices 122 and 124 in the drum 16. Therefore, as described briefly above, any card transported by the drum 16 and brought within the influence of the air streams from the gate 68 has its leading edge moved outwardly from the periphery of the drum. This brings the leading edge of that card under the influence of the vacuum pressure at the periphery of the drum 22. Further rotation of the drum 16 causes that card to be stripped completely from its periphery by the air streams from the gate 68, so that the card is deposited on the periphery of the drum 22.

As noted above, the thin leading edge of the gate 68 is positioned to be slightly spaced from the periphery of the drum 16. This is so that the cards transported by the drum 16, in the absence of the air streams from the gate 68, are able to pass between the gate and the drum 16 and thereby remain on the drum. Therefore, by controlling the introduction of air pressure to the gate transfer mechanism 68 by controllably energizing the solenoid-actuated valve 71, the cards on the periphery of the drum 16 can be transferred to the drum 22 or left on the drum 16.

Similarly, by controlling the energizing of the solenoid-actuated valve 76, the cards on the periphery of the drum 22 can be controllably transferred to the drum 16 or kept on the periphery of the drum 22. The gate 72, likewise, is spaced a sufficient distance from the drum 22 to permit the cards on the periphery of that drum to pass between it and the drum in the absence of air streams from the gate. The gate 72 is also pivoted to the table top 12, and this gate is positioned so that its air streams are directed tangentially of the drum 22 at its contiguous point to the drum 16.

In like manner, the gates 78 and 84 are mounted on the table top respectively to control the transfer of cards between the central drum 16 and the auxiliary drum 24. Likewise, the gates 90 and 91 control the transfer of cards to and from the drum 16 and the drum 18. Finally, the gates 98 and 99 control the transfer of cards between the drum 16 and the drum 20.

The actual transfer mechanism associated with one of the reversible feeding and stacking station such as the station 26 is shown in some detail in the perspective view of FIGURE 4. As noted above, the stations 40, 48 and 56 may all be constructed like the station 26 and they may all incorporate transfer mechanisms similar to the one associated with the station 26 and shown in FIGURE 4. The illustrated reversible station and its associated transfer mechanism are similar to the components shown and claimed in the copending application Ser. No. 645,639.

As shown in FIGURE 4, the leading and trailing walls 28 and 30 on the station 26 are secured to the table top 12 by means of a series of screws 248. The stackhead 32 has a pair of fingers 250 secured to the surface contiguous to the drum 22, and these fingers extend into peripheral grooves in the drum 22 adjacent the annular slots in that drum which correspond to the slots 122 and 124 (FIGURE 2) in the drum 16. The fingers 250 assure an intimate contact between the stackhead and the drum so that cards transported by the drum may be positively arrested by the stackhead when the stackhead is moved to its operative position. The end of the leading wall 28 is bifurcated, as clearly shown in FIGURE 4, to provide a rectangular opening into which the stackhead 32 can move when it is moved into its operative position.

The end of the trailing wall 30 is also bifurcated, as noted above, to receive the feedhead 34 as the feedhead is moved to its operative position. When the feedhead is so moved to its operative position, it enters the hollow rectangular area defined by the bracket portion of the lifter assembly 36. The lifter assembly 36, as shown in FIGURE 4, is mounted on a block 252 by means of screws 253.

The engaging surface of the feedhead 34 is designated as 254 in FIGURE 4, and as mentioned above, this surface engages the leading card in the station 26 when the feedhead is moved to its operative position. Suitable conduits extend through the feedhead, as fully explained in the copending application, Ser. No. 645,639, and these conduits terminate in orifices at the surface 254. A vacuum pressure is established at these orifices so that the leading card in the station 26, which has its trailing edge engaging the surface 254, is retained by that vacuum pressure against the friction force exerted on the leading edge of the card by the drum 22. This friction force is exerted against the card in a direction to draw that card out of the station 26.

It is evident that whenever the vacuum pressure at the surface 254 is terminated, the friction produced on the card by the drum 22 draws the leading card out of the station 26. As noted above, the space between the leading wall 28 and the edge of the drum 22 is made such that only one card at a time can be drawn from the station by the drum 22. Therefore, when the vacuum pressure at the face 254 of the feedhead is interrupted, the cards in the station 26 are sequentially fed to the periphery of the drum 22.

The vacuum pressure at the surface 254 of the feedhead 34 may conveniently be interrupted by energizing a solenoid-actuated valve in the supply line to that head. A stud 256 extends downwardly from the feedhead into a slot 258 in the table top 12, and this stud causes the feedhead to rotate about a pivot shaft 260 when the feedhead is retracted to its standby position. The shaft 260 moves in a slot 261 in the table top 12. As fully described in the copending application Ser. No. 645,639, an internal valve may be incorporated in the feedhead 34 to close off the vacuum pressure line when the feedhead is retracted to its standby position. The use of such an internal valve precludes any necessity for continually energizing the solenoid valve to close it when the feedhead is not in use. Such continual energizing of the solenoid valve would tend to burn out its energizing winding.

As noted above, the feedhead 34 and the stackhead 32 are so controlled that when the feedhead is moved into its operative position, the stackhead is retracted to its standby position, and vice versa. These two elements may be so controlled by a cam 262 (FIGURE 5) pivotally mounted on the underside of the table top 12 on a shaft 264 which extends through the table top. The feedhead 34 is mounted at one end of a lever 266. The lever 266 is pivoted to the underside of the table top 12 on a shaft 268 which extends through the table top. The feedhead is mounted on one end of this lever by means, for example, of the stud 260. As shown in FIGURE 5, the feedhead receives its vacuum pressure from an appropriate resilient feed line 270 that may be slipped over a coupler 272 which extends into the feedhead.

A cam follower 274 is rotatably mounted on the lever 266 between its pivot point and the end of the lever remote from the feedhead 36. The cam follower 274 is adapted to engage the periphery of the cam 262.

The stackhead 32 is mounted on one end of a lever 278 by a screw 279, and this head is adapted to move in a slot 281 in the table top 12. The lever 278 is pivotally mounted on the underside of the table top on a pivot shaft 280 which extends through the table top 12, and the lever 278 is disposed on the opposite side of the cam 262 from the lever 266. A cam follower 282 is rotatably mounted on the lever 278. This cam follower is mounted between the pivot shaft 280 and the end of the lever 278 remote from the stackhead 32. The cam follower 282 also engages the periphery of the cam 262.

A spring 284 extends between the other ends of the levers 266 and 278, and this spring is fastened at its opposite ends to each of the levers. The spring 284 biases the cam followers 274 and 282 against the periphery of the cam 262. The cam 262 is so shaped that when it is rotated through a 180° angle from a particular angular position, the lever 266 is adapted to be rotated in a clockwise direction in FIGURE 5 to bring the feedhead to its operative position. At the same time, the lever 278 is adapted to be rotated in a clockwise direction in FIGURE 5 when the cam moves through this angle and so as to move the stackhead 32 to its standby position. Then, during the next 180° rotation of the cam 262, the lever 266 rotates in a counterclockwise direction to move the feedhead 34 to its standby position, and the lever 278 also rotates in a counterclockwise direction to move the stackhead 32 to its operative position.

Therefore, an appropriate control of the cam 262 to rotate the cam through 180° causes the reversible station 26 to be conditioned in one instance to a feeding mode, and in the other instance it causes the station to be conditioned to a stacking mode. A suitable control for the cam 262 is shown in FIGURES 6 to 8, inclusive. This control, like the mechanism of FIGURE 5, is similar to that which is described in detail in the copending application Ser. No. 645,639.

As shown in FIGURE 6, for example, a sprocket 300 is mounted on the pivot shaft 264, and the sprocket is affixed to that shaft by means of a setscrew 301. Rotation of the sprocket 300, therefore, causes the shaft 264 and the cam 262 to rotate.

A bracket 302 is suspended from the underside of the table top 12, and this bracket supports a drive motor 304 at its lower end. The drive shaft 306 of the motor extends vertically upward, and the drive shaft is coupled to a speed reducer 308. The speed reducer 308, in turn, is coupled to an overriding clutch 310, and this clutch has a drive shaft 312 extending upwardly from it. A second sprocket 314 is secured to the drive shaft 312 by means of a setscrew 316. The sprocket 314 is positioned in the same horizontal plane as the sprocket 300, and a drive chain 318 intercouples the two sprockets.

The motor 304 is operated continuously, and when the clutch 310 is engaged, the cam 262 is slowly rotated to change the station 26 from one operational mode to the other. The clutch 310 is solenoid-controlled in a manner to be described and as described in detail in the copending application Ser. No. 645,639. The solenoid may be energized and each subsequent energizing of it causes it to engage for 180° of rotation only. Therefore, successively energizing the solenoid causes the cam 262 to rotate in each instance through 180°. Therefore, each time this solenoid is energized, the station changes from its existing mode to its other mode.

Details of the clutch mechanism are shown in FIGURES 7 and 8.

When the clutch 310 is disengaged, its lower portion 319 is freely rotated by the motor 304 and this portion rotates with respect to the upper portion 320 of the clutch. The second portion 320 is affixed to the drive shaft 312 on which the sprocket 314 is mounted by the setscrew 316. Rotation of the section 320 of the clutch 310 produces a rotation of the sprocket 314 which, in turn, causes the chain 318 to drive the sprocket 300 of the cam mechanism. Such rotation is realized when the clutch 310 is engaged. The clutch mechanism is enclosed in a housing 324 (FIGURE 7) which is mounted on the underside of the base plate 30 and the bracket 302.

A U-shaped bracket 330 (FIGURE 7) is mounted on the inside of the housing 324 by means of a pair of cap screws 332 and 334. The bracket 330 is disposed on one side of the clutch 310 and it serves to support a solenoid 336. The solenoid 336 is positioned so that its longitudinal axis extends substantially parallel to the rotational axis of the motor 304 and the clutch 310. The solenoid 336 has an armature 338 which extends through one end of the U-shaped bracket 330 when the solenoid is not energized. When the solenoid is energized, the armature 338 is retracted against the compression of a spring 340. The solenoid is held in the U-shaped bracket 330 by a screw 342 extending through the other end of the bracket and into the other end of the solenoid.

The clutch 310, as noted above, is of the over-riding type and it may be of the type commonly referred to as a "Hilliard" clutch. It includes a release bracket 344 which is mounted adjacent the section 320 of the clutch in coaxial relation with the axis of rotation of the clutch. The bracket 344 has a pair of radial ears 349 (FIGURE 8) positioned diametrically opposite each other. A pair of cap screws 346 and 348 extend from the section 320 of the clutch through slots 350 and 352 formed in the release bracket 344.

One ear of the bracket 344 normally engages the end of the solenoid armature 338 protruding through the bracket 330 to hold the clutch 310 in a released condition. This may best be seen in FIGURE 8. However, when the solenoid is energized to retract the armature 338, the armature releases the bracket 344 such that the section 320 of the clutch is free to be rotated by the section 319.

If the solenoid is energized for an extremely short interval, the diametrically opposite ears of the release bracket 344 make only a one-half revolution. This means that the solenoid 336 can be pulsed, and each time it is so pulsed, the cam mechanism is driven by one-half a complete revolution or through 180°. Therefore, successive pulsing of the solenoid 336 causes the station 26 to be set to one operational mode or the other. The actual constructional details of clutches of the type described above are well known to the art. For this reason, it is believed that a more detailed showing and description of the clutch 310 is unnecessary.

As mentioned above, a similar control may be used for the transfer mechanisms for each of the stations 40, 48 and 56. Therefore, each of the stations can be controlled electronically and conditioned to a stacking mode or a feeding mode, and this control may be made to any particular station independent of the others. Therefore, the feed of cards from the various stations to their associated auxiliary drums, and the feed of cards from the drums to the various stations may be controlled. Likewise, by a suitable control of the solenoid-actuated valves associated with the various gate transfer mechanisms, the transfer of cards between the central drum 16 and the auxiliary drums 18, 20, 22 and 24 can also be controlled.

In a manner to be described in detail, when it is desired to sort a stack of cards in the apparatus of FIGURE 1, such cards are inserted in stacked relationship in one of the reversible stations, for example, in the station 26. The electronic control system for the apparatus, which will be described, is then set so that each card from the stack will be processed with respect to the binary data of first digital significance provided on each card. In ensuing cycles of operation, these cards become stacked in order with respect to the binary data of progressive digital significance recorded on the cards.

The processing of the cards is accomplished by feeding the cards in succession from the station 26 to the auxiliary drum 22. In the first pass or cycle of operation, and as determined by the binary data of the first digital significance on each card, the cards are selected by either the gate 84 or the gate 90 to be subsequently stacked in either the station 48 or in the station 40. Then, for the next pass, the cards are fed first from the station 40 and then from the station 48, to be stacked in either the stations 56 or 26. This latter stacking also is carried out in accordance with the binary data of second digital significance on the cards.

This feeding and stacking of the cards is continued from one pair of stations to the next until each bit of binary information from the least significance to the greatest significance on each card has been processed. After such processing, the cards are stacked in a selected station, and they appear in that station in order with respect to the binary data of different significance processed on the cards in the successive passes.

A control system for the embodiment of the invention described above and for enabling that embodiment to perform the function discussed briefly in the preceding paragraph is shown in FIGURES 9a and 9b.

To reiterate, a group of cards are first placed in a stacked relationship in the station 26, and such cards are to be sorted and stacked in accordance with the binary information represented by the data of different significance on the individual cards. This, of course, pertains to a particular group of automatically controlled cycles. As pointed out previously, once sorting has been achieved with respect to data of particular significances on each card, a new group of cycles may be initiated to sort the cards with respect to other data on each card. Moreover, this operation may be continued for different data on the cards until they are sorted in accordance with full names or multidigit numbers.

It should be appreciated that the above discussion is only by way of example. For example, the processing can be of other information than binary information. Furthermore, the processing in each pass can involve a plurality of bits of information rather than only a single bit. The information processed in successive passes does not necessarily have to represent similar features such as numbers or letters. For example, the bits processed in first passes may represent information as to the agriculture in a country and the bits processed in a second pass may represent information as to the industry in a second country. It is necessary only that the information be considered by the person performing the analysis of the processed information to have some relationship.

By way of example, the binary data on the cards may be recorded in rows of varying significance. The top row, for example, may contain in a first column information relating to the least significant binary bit, and each successive row proceeding downwardly from the top row may contain in the first column binary bits of increasing significance. Therefore, for a selected column of a card, the least significant bit is at the top of the column and the bits increase in significance down the column. It should be appreciated that this represents only a simplified example and that actually binary bits of increasing significance may appear to have entirely unrelated positions with respect to the different rows and columns on the cards.

For the first pass, therefore, the cards in the station 26 are successively fed to the drum 22 and from there to the drum 16. All of the information on the card may be read in the first pass and in successive passes but only particular information is sensed and processed in each pass. The least significant bit of binary information of the top row is first sensed by the heads 64, and if this is "zero," the corresponding card is transferred to the drum 24 to be deposited in the station 40. On the other hand, all the cards having a least significant binary bit of "1" in the first column and the top row are transferred to the drum 18 and are deposited in the stack 48. The cards transferred to the stack 48 have a divergent path of movement on the transport means than the cards transferred to the station 40. This may be seen by comparing the schematic designations represented in blocks I and II of FIGURE 1a. In block I, none of the information has been processed and all of the cards are disposed in the stack 26. In block II, all of the cards having a value of "0" in the least significant position have become disposed in the stack 40 and all of the cards having a value of "1" in the least significant digit have become disposed in the stack 48.

When the first pass is completed, the second pass is automatically initiated. The cards from the station 40 are now returned to the drum 16 in sequence for processing by the heads 66. During the second pass, the next least significant bit of binary information is sensed and processed as it is read by the heads 66. The "zeros" are now transferred to the drum 20 to be deposited in the station 56, whereas the "ones" are transferred to the drum 22 to be deposited in the station 26. This may be seen from block III in FIGURE 1a. The cards transferred to the station 56 have a divergent path of movement on the transport means from the cards deposited in the station 26.

After all of the cards have been fed from the station 40, the cards from the station 48 are fed in sequence to the auxiliary drum 18 to be returned to the central drum 16. These cards from the station 48 also are deposited either in the station 56 or in the station 26 depending upon whether their binary bits at the second least significant level are respectively "zero" or "one." This may be seen from block III of FIGURE 1a, this block indicating that the cards having a "0" at the second least significant level are transferred from the station 48 to the station 56 and the cards having a value of "1" at this level of significance are transferred from the station 48 to the station 26. The cards transferred to the station 48 have a divergent path of movement on the transport means from the cards deposited in the station 56.

These passes continue, with the cards being fed from one pair of the reversible feeding-stacking stations to another, and with the system being automatically controlled so that for each pass a different level of significance insofar as the binary bits are concerned is read. The passes may be continued until all the levels of significance have been processed. Then, the cards are all returned to a single station and they appear in that station in a sorted condition with respect to the binary information processed in the different passes.

The operations described above are effectuated by the electronic control system of FIGURE 9, which will now be described.

The transducer heads 64 of FIGURE 1 read the information on the cards transferred to the drum 16 from the stations 26 and 56. The heads 64 are represented in FIGURE 9 by a group of transducer heads 64a, 64b, 64c and 64d. The transducer heads 66 of FIGURE 1, on the other hand, read the information on the cards transferred to the central drum 16 from the stations 40 and 48. The heads 66 are represented in FIGURES 9a and 9b by a group of transducer heads 66a, 66b, 66c and 66d.

The heads 64a or 66a, 64b or 66b, and 64c or 66c scan successive columns of binary bits on the cards. Of course, more or less heads can be used depending on the number of columns of binary bits recorded on each card. The heads 64a and 66a may scan the top row, the heads 64b and 66b may scan the row of next-to-least significance, and so on. The heads 64d and 66d scan the lower row of the cards. This lower row has a series of "ones" recorded on it at the respective positions of the card, and this row constitutes the clock channel of the card. It should be appreciated that an alignment of the heads 64a, 64b and 64c and of the heads 66a, 66b and 66c is only by way of example to provide a simplified explanation as to the operation of the invention. Actually, the different heads in each group would probably not be aligned since this would increase the spacing between the heads. This would not affect the operation of the system since the selection of the bits in the different rows would be adjusted in accordance with the displacements in positioning of the heads associated with the different rows.

The heads 64a and 66a, 64b and 66b, 64c and 66c, and 64d and 66d are respectively connected to a series of "or" networks 401, 403, 405 and 407. The "or" networks 401, 403, 405 and 407 in turn are connected respectively to a series of amplifiers 402, 404, 406 and 408. The output terminals of the amplifiers 402, 404 and 406 are connected to the left input terminals of a series of flip-flops 410, 412 and 414. The output terminal of the amplifier 408 is connected to a binary counter 416. The output terminals of the amplifiers 402, 404 and 406 are also respectively connected to a series of inverters 418, 420 and 422. The output terminals of the inverters are connected to the respective right input terminals of the flip-flops 410, 412 and 414.

The left and right output terminals of the flip-flop 410 are connected respectively to a pair of "and" networks 424 and 426. The left and right output terminals of the flip-flop 412 are connected respectively to a pair of "and" networks 428 and 430. The left and right output terminals of the flip-flop 414 are connected respectively to an "and" network 432 and to an "and" network 434.

The "and" network 424 is connected to the left input terminal of a flip-flop 436, and the "and" network 426 is connected to the right input terminal of that flip-flop. In similar manner, the "and" network 428 is connected to the left input terminal of a flip-flop 438, whereas the "and" network 430 is connected to the right input terminal of this flip-flop. Similarly the "and" network 432 is connected to the left input terminal of a flip-flop 440, and the "and" network 434 is connected to the right input terminal of this flip-flop.

The units referred to above, and which will be referred to subsequently as "flip-flops," "and" networks, and "or" networks, are known to the electronic computer art, and a detailed description of these units is believed to be unnecessary.

An "or" network is usually made up of a series of interconnected diodes, and this network is designed to pass to a common output terminal any of a plurality of signals introduced to its input terminals.

An "and" network is also composed of a plurality of interconnected diodes. The diodes in the "and" network are appropriately connected to pass a signal to a common output terminal of the network, only when a plurality of signals are simultaneously introduced to all of its input terminals.

A "flip-flop" is a bi-stable relaxation network which may be triggered to a "false" state by the trailing edge of a positive pulse introduced to its right input terminal, and which may be triggered to a "true" state by the trailing edge of a positive pulse introduced to its left input terminal. When the flip-flop is in a true state, it produces a relatively high voltage at its left output terminal and a relatively low voltage at its right output terminal. Conversely, when the flip-flop is in a false state, it produces a low output voltage on its left output terminal and a relatively high output voltage on its right output terminal. As noted above, the flip-flop has bi-stable characteristics, and it will remain in either one of its states until it is triggered to the other.

The information cards are represented as 400 in FIGURE 9a. As previously noted, each information card contains binary data which is preferably recorded on the cards in the form of dots of one magnetic polarity or the other respectively to represent unity or zero binary bits. These dots, as mentioned previously, are arranged in a series of horizontal rows along the cards, with the rows placed one under the other to form a plurality of vertical columns across each card. Each of these vertical columns corresponds to a position of the card. As also mentioned above, the bottom row of data contains magnetic dots of one polarity only, and these dots constitute clock data for the system to enable it to select information representing any desired digital significance on each card.

In the illustrated embodiment, and as noted above, three rows of binary data and a row of clock recordings are shown. It is evident that more or less rows may be used, depending upon the amount of information desired. As also mentioned, each of the transducer heads 64a and 66a, 64b and 66b, and 64c and 66c is positioned to scan a different row of data on the card. Since the number of such heads corresponds to the number of rows of binary bits, three heads in each group are shown only by way of example. The transducer heads 64d and 66d, as mentioned above, may scan the bottom or clock row to produce clock signals.

The binary counter 416 is connected to the input terminal of a selector 450, and the output terminal of the selector is connected to the input terminal of a compare network 448. The output terminal of the compare network is connected to each of the "and" networks 424, 426, 428, 430, 432 and 434.

The binary counter 416, the compare network 448, and the selector 450 are shown in FIGURE 10. The selector 450 may be adjusted so that the compare network 448 passes an output pulse to the "and" networks 424, 426, 528, 430, 432 and 434 at a selected count on the binary counter 416 corresponding to information of a selected digital significance on each of the cards.

As shown in FIGURE 10, the binary counter 416 may be formed from a plurality of flip-flops 416a, 416b, 416c and 416d. The selector 450 may be in the form of a plurality of single-pole double-throw switches 450a, 450b, 450c and 450d. The fixed contacts of the switches are respectively connected to the left and right output terminals of the associated flip-flops, and the armatures of the switches are respectively connected to the compare network 448.

It is evident from the showing in FIGURE 10, that for any particular setting of the armatures of the switches, they will have a relatively high voltage only when the corresponding flip-flops have a particular pattern of operational states. For example, a relative high voltage appears on the armature of the switch 450a only when the flip-flop 416a is in a true state. Likewise, high voltages appear on the armatures of the switches 450b and 450c only when the flip-flops 416b and 416c are in a false state, and a relatively high voltage appears on the armature of the switch 450d only when the flip-flop 416d is in a false state. Only when the flip-flops have these particular states in the illustrated embodiment of FIGURE 10, will the compare network pass a signal to its output lead. The compare network itself may be a conventional type of "and" network in this embodiment.

The flip-flops 416a, 416b, 416c and 416d of the binary counter may be interconnected in known manner (not shown) to form a typical binary counter. The counter is successively triggered as each card is scanned. The switches 450a, 450b, 450c and 450d may be set to any desired pattern corresponding to any selected count established in the binary counter. This count may correspond to information of a desired significance to be sensed and processed on the cards. Although four flip-flops are shown in the binary counter, more or less can be used depending upon the number of individual positions for each card.

Now, as the cards are transported by the drum 16 past either the heads 64a, 64b, 64c and 64d or past the heads 66a, 66b, 66c and 66d, each card is read by the heads and particular information is sensed in accordance with the operation of the compare network 448 and the selector 450. In the particular embodiment of the invention described in this application, the flip-flops 410, 412 and 414 are triggered simultaneously into operational states corresponding to the columns of data on the successive cards when a particular column corresponding to the selected information moves past the heads 64a, 64b or 64c or the heads 66a, 66b and 66c. The inverters 418, 420 and 422 assure that the flip-flops will be triggered by the positive and negative pulses from the amplifiers 402, 404 and 406, regardless of their preceding individual states.

The triggering of the flip-flops 410, 412 and 414 is ineffective insofar as the rest of the system is concerned except for the selected information to be sensed and processed on each card, as established by the operation of the selector 450. This is because a pulse is passed by the compare network 448 from the binary counter 416 only upon the occurrence of the information of selected digital significance.

As will be understood by a person skilled in the art, the operation of the selector 450 may be adjusted manually for the successive information to be processed on the cards or the selector 450 may be adjusted automatically. For example, the selector 450 may comprise a plurality of flip-flops which are connected to increase their count by an integer every time that the information in a particular column on each card has been processed. In this way, each successive column on the card may be processed in sequence.

The pulse passed by the compare network 448 activates the "and" networks 424, 426, 428, 430, 432 and 434. This causes the "and" networks to pass data from the flip-flops 410, 412 and 414 to the flip-flops 436, 438 and 440 only upon the occurrence of information of the selected digital significance. In the particular embodiment of the invention described in this application, the flip-flops 436, 438 and 440 are controlled, therefore, to assume individual operating conditions or states corresponding to the column of data on each card representing information of the selected digital significance. The flip-flop 436 represents the least significant binary bits, the flip-flop 438 represents the bits of second least significance, and the flip-flop 440 represents the bits of third least significance. The flip-flops 436, 438 and 440 are respectively connected to "and" networks 500, 502, and 504. The output terminals of these "and" networks are connected to an "or" network 506.

As shown in FIGURE 9b the system includes a manually-operated start switch 508. The armature of the switch 508 is connected to the positive terminal of a source 510 of direct voltage. This source also has a grounded common terminal and it has a negative terminal. The fixed contact of the switch 508 is connected to a capacitor 512 which, in turn, is connected to the input terminal of a differentiator 514. The output terminal of the differentiator is connected to an input terminal of an "or" network 516. The output terminal of the "or" network 516 is connected to the left input terminal of a flip-flop 518. The left output terminal of this flip-flop is connected to the control grid of a triode 520. A resistor 522 is connected between this control grid and the negative terminal of the source 510. The cathode of the triode is grounded, and the anode is connected to one terminal of an energizing winding 524. The other terminal of the winding 524 is connected to the positive terminal of the source 510. The winding 524 controls the transfer mechanism associated with the reversible stacking-feeding station 26 of FIGURE 1. The control is such (as will be described) that whenever the triode 520 is rendered conductive to energize the winding 524, the station 26 is conditioned to its feeding mode. On the other hand, when the triode 520 is rendered non-conductive, the winding 524 is deenergized and the station 26 is conditioned to its stacking mode.

In the description of the control mechanism of FIGURES 7 and 8, it was stated that the solenoid 336 controlled the clutch 310 in such a manner that successive energizing of the solenoid permitted the cam 262 of FIGURE 5 to be turned successively through 180° to cause the station alternately to function in its feeding and in its stacking mode. However, it was stated above that the energizing of the winding 524 caused the station to assume its feeding mode, and the deenergizing of that winding was stated as causing the station to assume its stacking mode.

The control system of FIGURE 11 illustrates one means whereby the winding 524 may appropriately control the described clutch 310 of the transfer mechanism of, for example, the station 26. It will be evident that similar controls may be used to control the transfer mechanisms associated with the other stations.

In the control system of FIGURE 11, the energizing winding 524 is shown as a relay winding controlling a double-throw relay switch 650. The armature of the relay switch is connected to the positive terminal of the source of direct voltage 510. The normally closed fixed contact of the relay switch 650 is connected to a capacitor 652, and the normally open fixed contact of the relay switch 650 is connected to a capacitor 654. The capacitors 652 and 654 are connected to respective input terminals of an "or" network 656. The output terminal of the the "or" network 656 is connected to the energizing winding of the solenoid 336 associated with the clutch 310 (FIGURES 7 and 8) and referred to above. The other terminal of the energizing winding of the solenoid 336 is grounded.

Whenever the triode 520 is rendered conductive so as to energize the relay winding 524, the armature of the relay switch 650 closes on its normally open contact so that a charge of current flows into the capacitor 654. This produces a current pulse which flows through the "or" network 656 and through the energizing winding 658. This current pulse is of a transient nature, and it persists until the capacitor 654 is fully charged. The circuit parameters are chosen so that the pulse persists just long enough to cause the solenoid 336 to actuate the clutch 310 of FIGURES 7 and 8 so as to permit the cam 262 to move through 180° and condition the station 26 to its feeding mode.

Subsequently, when the triode 520 is rendered nonconductive, the resulting deenergizing of the winding 524 causes the armature 650 to shift to its normally closed contact. This causes a transient current pulse to flow into the capacitor 652 and such pulse flows through the energizing winding of the solenoid 336 again to cause the solenoid to actuate the clutch mechanism 310. This causes the clutch 310 to permit the cam 262 to rotate a second 180° and to condition the station to its stacking mode.

A resistance 653 is shown in FIGURE 11 as being connected across the capacitance 654 to provide a discharge path for the capacitance when the armature 650 shifts into position to engage the right contact in FIGURE 11. The resistance 653 has a sufficiently high value to prevent the solenoid 336 from being energized after the capacitance 654 has become charged during the time that the armature 650 is engaging the left stationary contact in FIGURE 11. However, the resistance 653 has a sufficiently low value to discharge the capacitance 654 in a relatively short time so that the capacitance will become quickly prepared to receive another charging pulse. A resistance 655 having a value corresponding to that of the resistance 653 may be connected in parallel with the capacitance 652 to perform a function similar to that of the resistance 653.

Therefore, each time the winding 524 is energized, the transfer mechanism control is actuated to condition the station 26 as a feeding station. Alternately, each time the winding 524 is deenergized, the station 26 is controlled to function as a stacking station.

Returning now to the control system of FIGURES 9a and 9b, the signals from the differentiator 514 are applied through an "or" network 525 to the right input terminal of a flip-flop 526, through an "or" network 529 to the right input terminal of a flip-flop 580 and directly to the left input terminal of a flip-flop 528. The left output terminal of the flip-flop 528 is connected to an input terminal of the "and" network 500, and the left output terminal of the flip-flop 526 is connected to an input terminal of the "and" network 502. A delay line 530 is connected between the output terminal of the compare network 448 and an input terminal of each of the "and" networks 500, 502 and 504.

The differentiator 514 is also connected to an "or" network 532. This "or" network is connected to the left input terminal of a flip-flop 534. The left output terminal of the flip-flop 534 is connected to the control grid of a triode 536. A resistor 538 is connected to this control grid and to the negative terminal of the source of direct voltage 510. The cathode of the triode 536 is grounded, and the anode of this tube is connected to an energizing winding 540. The other side of the energizing winding 540 is connected to the positive terminal of the source of direct voltage 510.

The energizing winding 540 controls the solenoid-actuated valve 76 of the gate 72. Whenever this winding 540 is energized, the valve 76 is opened and the gate 72 emits streams of air to effect the transfer of cards from the auxiliary drum 22 to the central drum 16 of FIGURE 1.

The differentiator 514 is also connected to an "or" network 543 and the "or" network is connected to the right input terminal of a flip-flop 542. The left output terminal of the flip-flop 542 is connected to the control grid of a triode 544. The cathode of the triode is grounded, and the control grid is connected to a resistor 546. The other terminal of the resistor 546 is connected to the negative terminal of the source 510. The anode of the triode 544 is connected to one terminal of an energizing winding 548. The other terminal of this winding is connected to the positive terminal of the source 510.

The winding 548 controls the transfer mechanism of the station 40. In the same manner as that described in conjunction with the station 26, the station 40 is conditioned to a feeding mode when the winding 548 is energized, and this station is conditioned to a stacking mode when this winding is not energized. The energizing of the winding 548 is, of course, controlled by the flip-flop 542 and the triode 544.

The differentiator 514 is also connected to an "or" network 550. The output terminal of this "or" network is connected to the right input terminal of a flip-flop 552. The left output terminal of the flip-flop 552 is connected to the control grid of a triode 554. The cathode of this triode is grounded, and a resistor 556 is connected between its control grid and the negative terminal of the source of direct potential 510. An energizing coil 558 is connected to the anode of the tube 554 and to the positive terminal of the source of direct voltage 510. The winding 558 controls the transfer mechanism of the station 48.

In the described manner, whenever the flip-flop 552 is triggered to a true state to render the triode 554 conductive, the winding 558 is energized to condition the station 48 to its feeding mode. On the other hand, when the flip-flop 552 is triggered to a false state, the resulting nonconductivity of the triode 554 causes the winding 558 to be deenergized, and the station 48 to be conditioned to a stacking mode.

The differentiator 514 is also connected to an "or" network 560, and the output terminal of this "or" network is connected to the left input terminal of a flip-flop 562. The left output terminal of the flip-flop 562 is connected to the control grid of a triode 564, this control grid being connected to one side of a resistor 566. The other side of the resistor 566 is connected to the negative terminal of the source 510, and the cathode of the triode 564 is connected to ground. The anode of the triode is connected to one terminal of an energizing winding 568, and the other terminal of this winding is connected to the positive terminal of the source 510.

The winding 568 controls the solenoid-actuated valve 94 associated with the gate 90. Whenever the triode 564 is rendered conductive by the flip-flop 562, the resulting energizing of this winding causes streams of air to emerge from the gate 90. Such streams are effective to transfer cards from the central drum 16 to the auxiliary drum 18 of FIGURE 1.

As shown in FIGURE 1, the station 26 includes a pusher member 27 which is spring biased towards the front of the station to maintain the cards in stacked condition in the station. The pusher 27 has a conductive armature 29 affixed to it. Also, the feedhead 34 has a pair of contacts 35 extending through its surface 254. In a manner fully described in the copending application Ser. No. 645,639 when the last card leaves the station 26, the armature 29 short-circuits the conductive studs 35. The armature 29 and the studs 35 are shown in FIGURE 9b as a switch, and this switch closes when the last card leaves the station 26. One of the conductive studs 35 is connected to the positive terminal of the source 510, and the other stud 35 is connected to a capacitor 570.

The capacitor 570 is connected to the input terminal of a differentiator 572. The output terminal of the differentiator 572 is connected to a delay line 574. The output signals from the delay line are applied to the right input terminal of the flip-flop 534, to the left input terminals of the flip-flops 600 and 628 and through an "or" network 517 to the right input terminal of the flip-flop 518.

An "and" network 576 has input terminals connected to a delay line 640 and to the left output terminal of the flip-flop 528. The signals passing through the "and" network 576 are applied to an "or" network 578 which, in turn, is connected to the left input terminal of the flip-flop 542. The signals from the "and" network 576 are also applied through an "or" network 527 to the right input terminal of the flip-flop 528, through the "or" network 529 to the right input terminal of the flip-flop 580 and directly to the left input terminal of the flip-flop 526. The left output terminal of the flip-flop 526 is connected to an input terminal of the "and" network 502.

The "and" network 576 is also connected to the right input terminal of the flip-flop 562, to the right input terminal of a flip-flop 600 and to an "or" network 582. The output terminal of the "or" network 582 is connected to the left input terminal of a flip-flop 584. The left output terminal of the flip-flop 584 is connected to the control grid of a triode 586. The cathode of the triode 586 is grounded, and a resistor 588 is connected between the control grid and the negative terminal of the source 510. The anode of the triode 586 is connected to an energizing coil 590 which, in turn, is connected to the positive terminal of the source 510.

The winding 590 controls the solenoid-actuated valve 82 associated with the gate 78. When the solenoid-actuated valve 82 is energized, the gate 78 emits streams of air which are used to transfer cards from the auxiliary drum 24 back to the central drum 16 of FIGURE 1. Moreover, the energizing of the solenoid-actuated valve 82 is controlled by the energizing of the winding 590 by the triode 586 under the control of the flip-flop 584.

The signals from the "and" network 576 are applied through an "or" network 593 to the left input terminal of a flip-flop 592. Signals also pass through the "or" network 593 to the left input terminal of the flip-flop 592 from an "and" network 670. The left output terminal of the flip-flop 592 is connected to the control grid of a triode 594. This control grid is connected to a resistor 596 which is connected to the negative terminal of the source 510. The cathode of the triode 594 is grounded, and the anode is connected to one side of an energizing winding 598. The other side of this winding is connected to the positive terminal of the source 510. The winding 598 controls the solenoid-actuated valve 71 which is associated with the gate 68. When the winding 598 is energized, the gate 68 is effective to transfer cards from the central drum 16 to the auxiliary drum 22 of FIGURE 1.

The "and" network 576 is also connected to the right input terminal of a flip-flop 600. The left output terminal of the flip-flop 600 is connected to the control grid of a triode 602. The cathode of the triode is grounded, and the control grid of the triode is connected to a resistor 604, this resistor being connected to the negative terminal of the source 510. The anode of the triode 602 is connected to an energizing winding 606 which is connected to the positive terminal of the source 510. The winding 606 is associated with the station 56. As with the previous stations, when this winding 606 is energized the station 56 is conditioned to a feeding mode, and when this winding is not energized the station is conditioned to a stacking mode.

The station 40 includes a pusher member 41 (FIGURE 1). Like the pusher member 27 of the station 26, the pusher 41 is spring-biased to the forward end of the station to maintain the cards in a stacked condition. The pusher 41 has an armature 43, and when the last card leaves this armature connects with a pair of conductive studs 45 extending out of the surface of the feedhead 44.

As shown in FIGURE 9b, one of the studs 45 is connected to the positive terminal of the source 510, and the other stud is connected to a capacitor 608. The capacitor 608 is connected to the input terminal of a differentiator 610, and the differentiator is connected to a delay line 612. The delay line 612 is connected to an input terminal of an "and" network 611 having another input terminal connected to the left output terminal of the flip-flop 526. The output signals from the "and" network 611 are applied to the left input terminal of a flip-flop 614. The left output terminal of the flip-flop 614 is connected to the control grid of a triode 616. The cathode of this triode is grounded, and the control grid is connected to one terminal of a resistor 618, the resistor being connected to the negative terminal of the source 510. An energizing winding 620 is connected to the anode of the triode 616 and to the positive terminal of the source 510. This energizing winding 620 is associated with the solenoid-actuated valve 96 of the gate 91. When the flip-flop 614 is triggered to its true state, the triode 616 is rendered conductive to energize the winding 620. This causes the gate 91 to emit streams of air and causes the cards on the auxiliary drum 18 to be transferred to the central drum 16 of FIGURE 1.

The signals from the output terminal of the "and" network 611 are also applied to the left input terminal of the flip-flop 552 and through an "or" network 583 to the right input terminal of the flip-flop 584. The "or" network 583 also has signals applied to it from the delay line 640.

The output signals from the delay line 612 are applied to an input terminal of an "and" network 615, another input terminal of which is connected to the right output terminal of a flip-flop 591. The signals from the "and" network 615 pass to the "or" networks 516, 532, 543, 560, 583 and 595. The left and right input terminals of the flip-flop 591 are respectively connected to the differentiator 514 and the "and" network 670. The signals on the left output terminal of the flip-flop 591 control the operation of "and" networks 644 and 646.

The station 48 includes a pusher member 49 (FIGURE 1) which is like the pushers 27 and 41 of the stations 26 and 40. The pusher member 49 includes an armature 51. The feedhead 52 of the station 48 includes a pair of conductive studs 53, and these studs are contacted by the armature 51 as the last card leaves the station 48.

One of the studs 53 is connected to the positive terminal of the source 510 (FIGURE 9b) and the other stud 53 is connected to a capacitor 623. The capacitor 623 is connected to a differentiator 624, and the differentiator is connected to a delay line 626. The output terminal of the delay line 626 is connected to the left input terminal of the flip-flop 580 and to the "or" networks 525 and 527, which respectively pass signals to the right input terminals of the flip-flops 526 and 528.

The delay line 626 is also connected to the "or" network 543, to the right input terminal of the flip-flop 614 and to the "or" networks 516, 532, 550 and 560. In addition the signals from the output terminal of the delay line 626 are applied through an "or" network 595 to the right input terminal of the flip-flop 592 and to the right input terminal of a flip-flop 628. The "or" network 595 also receives the output signals from an "and" network 615.

The left output terminal of the flip-flop 628 is connected to the control grid of a triode 630. This control grid is connected to a resistor 632, the resistor being connected to the negative terminal of the source 510. The cathode of the triode 630 is grounded, and an energizing winding 634 is connected between its anode and the positive terminal of the source 510. This energizing winding controls the solenoid-actuated valve 103 associated with the gate 99. When the winding 634 is energized by the conductivity of the triode 630, the gate 99 is effective to transfer cards from the auxiliary drum 20 to the central drum 16 of FIGURE 1.

The station 56 includes a pusher 57 which is like the pushers 27, 41 and 49 referred to above. The pusher 57 has an armature 59 mounted on it. Also, a pair of conductive studs 61 extend through the feedhead 58 of the station 56 to be short-circuited by the armature 59 when the last card leaves the station 56. One of the studs 61 in FIGURE 9b is connected to the positive terminal of the source 510, and the other stud is connected to an input terminal of an "and" network 637 having another input terminal connected to the left output terminal of the flip-flop 600. The output signals from the "and" network 637 are applied to a capacitor 636. The capacitor 636 is connected to a differentiator 638, and the differentiator is connected to the delay line 640.

The "or" network 506 is connected to the input terminal of a delay line 642. The output terminal of the delay line is connected to an input terminal of an "and" network 644 and to the input terminal of an "and" network 646. The output terminal of the "and" network 644 is connected to the left input terminal of a flip-flop 646 and to the input terminal of a delay line 648. The output terminal of the delay line 648 is connected to the right input terminal of the flip-flop 646. The left output terminal of the flip-flop 646 is connected to the control grid of a triode 651.

A resistor 653 is connected to the control grid and to the negative terminal of the source 510. An energizing coil 655 has one terminal connected to the anode of the triode 651, and the other terminal of this coil is connected to the positive terminal of the source 510. The cathode of the triode 651, like the cathodes of all the other triodes, is connected to ground.

The energizing winding 655 is associated with the solenoid-actuated valve 88 of the gate 84. When this winding is energized, this gate is effective to cause the cards to be transferred from the central drum 16 to the auxiliary drum 24 of FIGURE 1.

The "and" network 646 is connected to the left input terminal of a flip-flop 659 and to the input terminal of a delay line 660. The output terminal of the delay line 660 is connected to the right input terminal of the flip-flop 659. The left output terminal of the flip-flop 659 is connected to the control grid of a triode 662. The cathode of this triode is grounded, and a resistor 663 is connected from its control grid to the negative terminal of the source 510. The anode of this tube is connected to one terminal of an energizing winding 664, the other terminal of this winding being connected to the positive terminal of the source 510.

The winding 664 controls the solenoid-actuated valve 101 of the gate 98, and when this winding is energized the gate 98 is activated to effect the transfer of cards from the central drum 16 to the auxiliary drum 20 of FIGURE 1.

The output terminal of the delay line 626 is connected to one input terminal of an "or" network 666, and the output terminal of the differentiator 514 is connected to another input terminal of that "or" network. The output terminal of the "or" network 666 is connected to the left input terminal of a flip-flop 668.

The output terminal of the delay line 640 is connected to the right input terminal of the flip-flop 668. The left output terminal of the flip-flop 668 is connected to an input terminal of the "and" network 644, and the right output terminal of the flip-flop 668 is connected to an input terminal of the "and" network 646.

The left output terminal of the flip-flop 580 is connected to an input terminal of an "and" network 670.

The output terminal of the delay line 640 is connected to another input terminal of the "and" network 670. The output terminal of the "and" network 670 is connected to an input terminal of the "or" network 578 and to an input terminal of the "or" network 582.

To place the system in operation, the cards to be sorted are first placed in the station 26, and the selector 450 is adjusted so that the cards will be sorted in accordance with the binary data at a particular column on each card, such column representing information of a selected digital significance. Then, the start switch 508 is manually depressed and released to initiate the sorting operation.

The actuation of the switch 508 causes a pulse of current to flow into the capacitor 512, which in turn causes the differentiator 514 to produce a sharp output pulse. This output pulse from the differentiator is introduced to the left input terminal of the flip-flop 528 to trigger that flip-flop to its true state. The triggering of the flip-flop 528 to its true state causes the "and" network 500 to be conditioned for translation. It will be remembered that this is desired for the first pass, because only the least significant bit of binary information on the cards at the selected column is to be sensed, and the operational state of the flip-flop 436 for successive cards is indicative of this bit. It should be appreciated that the circuitry for initiating the sorting operation is included only by way of example and that a considerable number of other initiating circuits may be used by persons skilled in the art.

The output pulse from the differentiator 514 is also introduced to the right input terminals of the flip-flops 526 and 580 to trigger those flip-flops to the false states. Since both of the flip-flops 526 and 580 are in their false states, both of the "and" networks 502 and 504 are rendered nonconductive. This occurs because for the first pass it is desired only to process the least significant bit of binary data at the selected column of each card.

Therefore, for the reasons described above, as each card passes the heads 64a, 64b, 64c and 64d, the "or" network 506 produces an output pulse for each card that has a value of "0" for the least significant digit, and the "or" network 506 produces no output pulse for each card having a value of "1" for the least significant digit. The reason for this is that the flip-flop 436 is triggered to a false state only when the card being processed has a value of "0" for the digit of selected significance. Therefore, even though the "and" network 500 may have been rendered conductive insofar as the flip-flop 528 is concerned, the flip-flop 436 must be in its false state or else the "and" network will not translate pulses introduced to its third input terminal.

The pulses are introduced by the delay line 530 to the third input terminal of the "and" network 500 and to the "and" networks 502 and 504. The delay line 530 produces such a pulse a selected time after the compare network 448 produces a pulse indicative of the selected column of the card being processed. Therefore, when the card being processed indicates a "zero" at its least significant binary bit, the pulse from the delay line 530 is translated by the "and" network 500 to the "or" network 506 but when the card being processed exhibits a "one" for the least significant digit, the resulting "true" state of the flip-flop 436 does not permit the "and" network 500 to pass the pulse from the delay line 530 to the "or" network 506.

It should be pointed out that for the other binary bits of increasing significance a like output pulse from the delay line 530 will be translated to the "or" network 506 by either the "and" network 502 or by the "and" network 504 when such networks are conditioned for conductivity by the respective flip-flops 580 and 526 and when the flip-flops 438 and 440 are in their false states. In short, therefore, the "or" network 506 produces an output pulse only when the card being processed has a "zero" binary bit recorded at the selected level of significance being processed during any particular pass.

The output pulse from the differentiator 514 is also passed through the "or" network 516 to the left input terminal of the flip-flop 518. This pulse triggers the flip-flop 518 to a true state to cause the triode 520 to become conductive and thereby energize the winding 524. As described above, this energizing of the winding 524 conditions the station 26 to the feeding mode, and the cards placed in that station are successively fed to the periphery of the auxiliary transporting drum 22. For subsequent reading of the information by the heads 64a, 64b, 64c and 64d as described in the preceding paragraphs.

The output pulse from the differentiator 514 is also translated by the "or" network 532 to the left input terminal of the flip-flop 534. The flip-flop 534 is, therefore, triggered to its true state to render the triode 536 conductive so as to energize the winding 540. This causes the gate 72 to become effective so that the cards fed from the station 26 to the drum 22 are transferred in sequence to the central drum 16. The central drum now carries the cards in succession past the heads 64a, 64b, 64c and 64d.

The output pulse from the differentiator 514 is also introduced through the "or" network 543 to the right input terminal of the flip-flop 542 to trigger that flip-flop to a false state. This causes the triode 544 to become nonconductive so that the station 40 is conditioned in the described manner to its stacking mode. Likewise, the output pulse from the differentiator 514 is introduced through the "or" network 550 to the right input terminal of the flip-flop 552 to trigger that flip-flop to the false state. The station 48 is accordingly also conditioned to a stacking mode.

The output pulse from the differentiator 514 is also introduced through the "or" network 560 to the left input terminal of the flip-flop 562. This causes the flip-flop 562 to be triggered to a true state so that the triode 564 is rendered conductive to activate the gate 90.

Finally, the output pulse from the differentiator 514 is introduced through the "or" network 666 to the left input terminal of the flip-flop 668. This causes the flip-flop 668 to be triggered to a true state. Because the flip-flop 668 is in a true state, the "and" network 644 is conditioned for conduction. Therefore, each time an output pulse is developed by the "or" network 506, and after such pulse is delayed a short interval by the delay line 642, the pulse is introduced to the left input terminal of the flip-flop 646 to trigger that flip-flop to the true state. Then, after a delay established by the delay line 648, the pulse is introduced to the right input terminal of the flip-flop 646 to return that flip-flop to the false state.

The delay produced by the delay line 642 is sufficient so that the card producing the pulse at the digit of selected significance can come to the vicinity of the gate 84. Then, the gate is activated for a time determined by the delay line 648. This time is sufficient to cause the card to be transferred to the auxiliary drum 24.

Therefore, the cards fed from the station 26 to the auxiliary drum 22 are all transferred in sequence by the gate 72 to the central transporting drum 16. These cards are then carried in succession past the heads 64a, 64b, 64c and 64d. Each card having a value of "0" for the digit of least significance activates the gate 84 since such card causes a pulse to be produced by the "or" network 506. Each such card activating the gate 84 is transferred by the gate to the auxiliary drum 24. The station 40 is conditioned to its stacking mode, so that all the cards transferred to the drum 24 are deposited in the station 40, and all such cards have a value of "0" for the digit of least significance. The stacking of the cards in the station 40 in the first pass may be seen from block II of FIGURE 1a.

All of the other cards transferred from the drum 22 to the drum 16 during this first pass are transported by the drum 16 past the gate 84 until they come under the influence of the activated gate 90. These cards have values of "1" for the digit of least significance. Such cards are transferred to the auxiliary drum 18 and become deposited in the station 48 because of the stacking mode of operation of that station. The stacking of the cards in the station 48 during the first pass may be seen from block II of FIGURE 1a.

When the last card leaves the station 26, the armature 29 engages the contacts 35 to produce a closure of the switch formed by the armature and the contacts. This causes a current pulse to flow into the capacitor 570 so that the differentiator 572 develops an output pulse. The delay line 574 delays this output pulse for a time sufficient for the last card to become stacked in either the station 40 or in the station 48 depending upon whether its least significant binary bit position is "1" or "0."

The output pulse from the delay line 574 is introduced through the "or" network 517 to the right input terminal of the flip-flop 518 to return the station 26 to the stacking mode in the described manner. Likewise, this output pulse is introduced to the right input terminal of the flip-flop 534 to de-activate the gate 72. The output pulse from the delay line 574 is also introduced to the left output terminal of the flip-flop 600 to trigger the flip-flop to the true state. This activates the station 56 into the feeding mode. At the same time, the gate 99 becomes activated because of the introduction of a triggering signal from the delay line 574 to the flip-flop 628 to trigger the flip-flop to the true state of operation.

In the first pass, all of the cards may initially be in the station 26 and none of the cards may be in the station 56. This is the condition shown in block I of FIGURE 1a. However, if there should initially be any cards in the station 56, the cards would be properly processed and would be separated so that cards with a value of "0" for the least significant digit would become deposited in the station 40 and cards with a value of "1" for the least significant digit would become deposited in the station 48. This will be seen from the subsequent discussion for a pass involving a transfer of cards from both of the stations 26 and 56.

Since there are no cards initially in the station 56, the armature 59 engages the contacts 61 to close the switch formed by the armature and the contacts. This causes a pulse to be produced by the capacitance 636 and the differentiator 638 for introduction to the delay line 640. The pulse is able to be produced only after the station 56 has become disposed in the feeding mode because of the introduction of a signal to the "and" network 637 from the left output terminal of the flip-flop 600. In this way, a signal cannot be prematurely produced by the differentiator 638 even if there may be initially no cards in the station 56. The output pulse from the delay line 640 is introduced to the right input terminal of the flip-flop 668 to trigger the flip-flop 668 to the false state of operation.

Because of the fact that the flip-flop 528 is still in its true state, the "and" network 576 is conditioned for translation so that the output pulse from the delay line 640 becomes translated by the "and" network to the right input terminal of the flip-flops 528 and 580 and to the left input terminal of the flip-flop 526. The resulting operational states of the flip-flops 526 and 528 now cause the "and" network 500 to become closed and the "and" network 502 to be rendered open for the passage of a pulse from the delay line 530 whenever the flip-flop 438 is in its false state.

The above is the desired condition for the second pass during which the binary bits of second least significance are to be processed. In the embodiment described in this application, the second least significant digit appears in the bit common to the first vertical column and the second horizontal row. The "and" network 504 is still nonconductive because of the fact that the flip-flop 580 is still in the false state.

The output pulse from the "and" network 576 is also introduced through the "or" network 578 to the left input terminal of the flip-flop 542. This triggers the flip-flop 542 to a true state to render the triode 544 conductive such that the station 40 becomes disposed in its feeding mode. Therefore, the cards having a value of "0" for the digit of least significance are fed sequentially from the station 40 to the periphery of the drum 24.

The output pulse from the "and" network 576 is also introduced through the "or" network 582 to the left input terminal of the flip-flop 584. This causes the flip-flop 584 to render the triode 586 conductive and thereby activate the gate 78. This activation of the gate 78 causes the cards fed from the station 40 to the drum 24 to become transferred to the central drum 16.

The cards are carried by the central drum 16 past the gate 90, which is now deactivated because of the fact that the output pulse from the "and" network 576 is introduced to the right input terminal of the flip-flop 562 to render that flip-flop in the false state. After moving with the drum 16 past the gate 90, the cards are carried by the drum 16 past the transducer heads 66a, 66b, 66c and 66d. The information on the cards is read by these transducer heads but only selected information on the cards is sensed and processed. This sensed information is obtained from the bit common to the first vertical column and the second horizontal row on each card. In accordance with the processing of the selected information, the "or" network 506 develops pulses indicative of a value of "0" for the digits of second least significance.

The output pulse from the "and" network 576 is also introduced to the left input terminal of the flip-flop 592 to trigger that flip-flop to the true state such that the gate 68 may become activated. In addition, this output pulse is introduced to the right input terminal of the flip-flop 600 to trigger that flip-flop to the false state and thereby condition the station 56 to a stacking mode.

Since the flip-flop 668 is in the false state of operation, the "and" network 646, rather than the "and" network 644, becomes conditioned for conduction. This causes the output pulses from the "or" network 506 to obtain an actuation of the gate 98 rather than the gate 84. Therefore, the cards read by the transducer heads 66a, 66b, 66c and 66d and having a value of "0" for the digit of second least significance are transferred by the gate 98 to the auxiliary drum 20. These cards then become deposited in the station 56. The cards having a value of "1" for the digit of second least significance are carried past the gate 98 by the drum 16 and are transferred by the gate 68 to the auxiliary transporting drum 22. These latter cards are then deposited in the station 26.

When the last card leaves the station 40, the armature 43 engages the contacts 45 so as to close the switch formed by the armature and the contacts. This causes a current pulse to be developed through the capacitor 608. This current pulse in turn causes the differentiator 610 to develop a sharpened output pulse. The delay line 612 delays the output pulse from the differentiator 610 a sufficient time for the last card from the card holder station 40 to become deposited in either the card-holder station 56 or in the card-holder station 26. Then the delay line 612 develops an output pulse which passes through the "and" network 611 because of the introduction to the "and" network of a relatively high voltage from the left output terminal of the flip-flop 526. The signal passing through the "and" network 611 triggers the flip-flop 614 to the true state to activate the gate 91. The signal passing through the "and" network 611 also triggers the flip-flop 552 to the true state to condition the station 48 to the feeding mode. The signal passing through the "and" network 611 is further introduced to the right input terminal of the flip-flop 584 to trigger that flip-flop to the false state so as to deactivate the gate 78.

Therefore, after the last card has left the station 40 and has been deposited in either the station 56 or in the station 26, the station 48 is conditioned to feed cards sequentially to the periphery of the drum 18. Such cards are transferred by the activated gate 91 to the central drum 16. These cards, as in the previous instance, are transferred by the gate 98 to the drum 20 and are deposited in the stack 56 when they exhibit a value of "0" for the digit of second least significance. The cards are transferred to the drum 22 and are deposited in the station 26 when they exhibit a value of "1" for the digit of second least significance.

When the last card leaves the station 48, the armature 51 engages the contacts 53 so as to close the switch formed by the armature and the contacts. This causes the differentiator 624 to develop an output pulse in accordance with the flow of current through the capacitor 623. The output pulse from the differentiator 624 is delayed by the line 626 a sufficient time to enable the last card from the station 48 to become deposited in either the station 56 or in the station 26. Then, the output pulse from the delay line 626 triggers the flip-flop 580 to the true state and triggers the flip-flop 526 to the false state. The "and" network 502 is now rendered nonconductive, and the "and" network 504 is conditioned to be rendered conductive. The "and" network 500 is nonconductive because of the false state of the flip-flop 528. Therefore, the system is conditioned so that the cards may be processed with respect to the binary bits representing the digits of third least significance. Such digits appear in the embodiment constituting this invention at the bit common to the first vertical column and the third horizontal row from the top.

The output pulse from the delay line 626 is also used to trigger the flip-flop 614 to the false state so as to deactivate the gate 91. This pulse is also introduced through the "or" network 666 to the left input terminal of the flip-flop 668 to trigger that flip-flop to the true state. This returns the "and" network 644 to a conductive condition and renders the "and" network 646 nonconductive. Therefore, the pulses passing through the "or" network 506 to represent a value of "0" for the digits of third least significance on each card activate the gate 84 to transfer such cards to the auxiliary drum 24.

The output pulse from the delay line 626 is also introduced through the "or" network 560 to the left input terminal of the flip-flop 562 to activate the gate 90. In like manner, the output pulse from the delay line 626 triggers the flip-flop 592 to a false state to deactivate the gate 68. The output pulse from the delay line 626 also triggers the flip-flop 518 to the true state to condition the station 26 to the feeding mode. The flip-flop 628 also becomes triggered to the false state by the output pulse from the delay line 626 so as to obtain a de-activation of the gate 99.

Therefore, the cards in the station 26 are fed in sequence to the auxiliary drum 22. These cards are transferred to the central drum 16 for reading of the information on the cards by the transducer heads 64a, 64b, 64c and 64d and for the sensing and processing of the bits representing the digits of third least significance. The cards having a value of "0" for the digits of third least significance cause the gate 84 to be activated so that such cards are transferred to the drum 24 to be deposited in the station 40. This station is conditioned to its stacking mode by the introduction of the output pulse from the delay line 626 to the right input terminal of the flip-flop 542 through the "or" network 543.

Also, the cards having a value of "1" for the digits of third least significance pass the gate 84 and come under the influence of the activated gate 90 to be transferred to the auxiliary drum 18 and deposited in the station 48. This station likewise is conditioned to its stacking mode by the introduction of the pulse from the delay line 626 through the "or" network 550 to the right input terminal of the flip-flop 552.

The above process continues until the last card leaves the station 26. When this occurs the armature 29 engages the contacts 35 to close the switch formed by the armature and the contacts. This causes the delay line 574 to generate a pulse. This pulse is generated after the last card from the station 26 is deposited in either the station 40 or in the station 48. Then, the pulse from the delay line 574 is introduced to the left input terminal of the flip-flop 600 to condition the station 56 to the feeding mode. This pulse is also introduced to the left input terminal of the flip-flop 628 to activate the gate 99. In like manner, the pulse from the delay line 574 is introduced to the right input terminal of the flip-flop 534 to deactivate the gate 72. The pulse from the delay line 574 is also introduced to the right input terminal of the flip-flop 518 to trigger the flip-flop to the false state. This causes the station 26 to become disposed in its stacking mode.

Now, the cards previously deposited in the station 56 are fed to the auxiliary drum 20 and are transferred from that drum by the activated gate 99 to the central drum 16 of FIGURE 1. These cards are then deposited in either the station 40 or in the station 48, depending upon whether they have a value of "0" or a value of "1" for the digits of third least significance.

When the last card leaves the station 56 and is deposited in either the stations 40 and 48, the sorting process insofar as the present system is concerned has been completed. It should be reiterated that the passes are continued until each significant level has been processed. In the present embodiment, three significant levels are presumed, so that three passes complete the sorting process. It is now merely necessary to transfer the cards from the station 40 to the station 48 so that all the cards in the station 48 may be properly sorted insofar as the binary data at a selected position is concerned. The cards in the station 40 are first transferred to the station 26 to invert the order of the cards. The cards are then transferred from the station 26 to the station 48 so that all of the cards in the station 48 will be in the proper order.

The return of the cards from the station 40 to the station 48 is achieved in the following manner. The last card out of the station 56 again causes the delay line 640 to develop an output pulse after this card has been deposited in either the station 40 or in the station 48. Since the flip-flop 528 is in its false state, the "and" network 576 is nonconductive and does not translate the output pulse from the delay line 640 to the stages connected to the output terminal of this "and" network. However, because the flip-flop 580 is in its true state for the last pass, the "and" network 670 is conductive and this "and" network translates the output pulse from the delay line 640 through the "or" network 578 to the left input terminal of the flip-flop 542 to condition the station 40 to the feeding mode. The pulse from the "and" network 670 is also introduced through the "or" network 517 to the right input terminal of the flip-flop 518 to obtain a disposition of the station 26 in the stacking mode. The pulse from the "and" network 670 is further introduced through the "or" network 593 to the left input terminal of the flip-flop 592 to activate the gate 68, and the pulse from the "and" network 670 is also introduced through the "or" network 582 to the left input terminal of the flip-flop 584 to activate the gate 78.

Therefore, the cards in the station 40 are fed to the drum 24, and such cards are transferred to the drum 16 and carried by that drum to the gate 68. This latter gate transfers the cards to the drum 22 and the latter drum carries them to the station 26. In this way, all the cards become stacked in the station 26 and become inverted in order in the station 26 with respect to their disposition in the station 40. This may be seen from a comparison of blocks IV and V in FIGURE 1a.

After the last card has left the station 40, a signal is produced by the delay line 612. This signal is able to pass through the "and" network 615 because of the introduction of a relatively high voltage to the "and" network from the right output terminal of the flip-flop 591. The flip-flop 591 is in the false state of operation at this time because of the prior introduction of a signal from the "and" network 670.

The signal from the "and" network 615 is introduced through the "or" network 516 to the flip-flop 518 to obtain a disposition of the station 26 in the feeding mode. The signal from the "and" network 615 also passes through the "or" network 532 and triggers the flip-flop 534 to the true state so that the gate 72 will become activated. In this way, the cards in the station 26 become sequentially transferred to the drum 22 and become transferred by the gate 72 from the drum 22 to the drum 16.

The signal from the "and" network 615 is also introduced to the "or" network 583, the "or" network 595 and the "or" network 543 to trigger the flip-flops 584, 592 and 542 to the false states. This causes the gates 68 and 78 to become deactivated and the station 40 to become disposed in the stacking mode.

The cards transferred to the drum 16 from the drum 22 move with the drum 16 to the gate 90. This gate is activated by the passage of a signal from the "and" network 615 through the "or" network 560 to the left input terminal of the flip-flop 562. Because of the activation of the gate 90, the cards become transferred from the drum 16 to the drum 18 and are carried by the drum 18 to the station 48. The cards then become stacked in the station 48 since the station has previously become disposed in the stacking mode. The cards become stacked in a logical order in accordance with the information on the cards, as may be seen from block VI of FIGURE 1a.

It should be appreciated that the system shown in FIGURES 1 to 11, inclusive, and described above can be made to operate on an automatic basis in processing the information in successive vertical columns on the cards. For example, the selector 450 in FIGURE 9a can be formed from a plurality of flip-flops connected to provide a count on a sequential basis. When the last card has passed out of the station 48, a signal is produced by the delay line 626. This signal may be introduced to an "and" network (not shown) which is prepared for activation by the signal from the "and" network 670 in FIGURE 9b. The signal from the additional "and" network (not shown) may be introduced to the selector 450 to increase the count in the selector by an integral. In this way, the selector 450 operates to obtain an activation of the second vertical column on each card rather than the first vertical column.

Figure 1A:
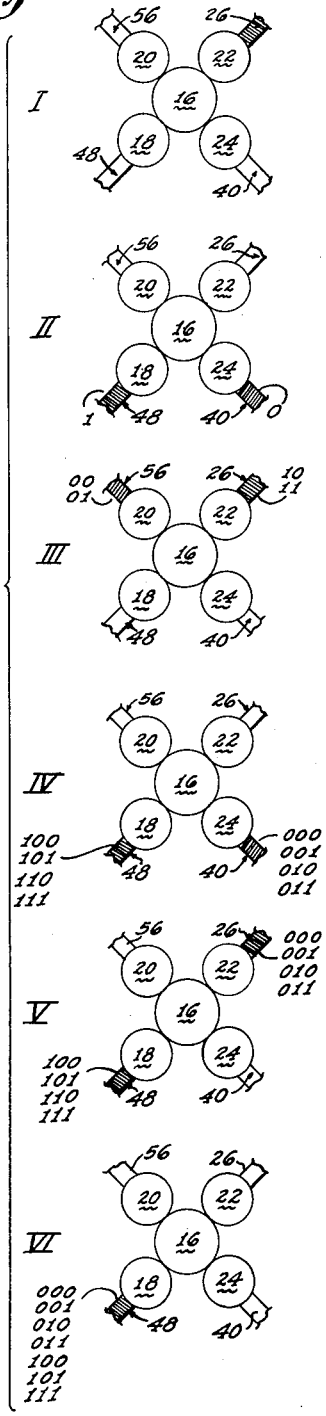

The signal from the additional "and" network (not shown) may also be introduced to the flip-flops 528 and 580 to trigger the flip-flop 528 to the true state and the flip-flop 580 to the false state. In this way, the bit common to the second vertical column and the top horizontal row on each card can be sensed and processed. The signal from the additional "and" network (not shown) may also used to obtain a transfer of the cards in the stations 40 and 48 to the stations 26 and 56 in a manner similar to that described previously and to obtain a sorting of the cards in accordance with the data representing the digits of fourth least significance. Under such an automatic operation, the cards would not have to be transferred from the station 40 to the station 48, as described a few paragraphs previously and as shown in FIGURE 1a (blocks IV, V and VI). As previously described, the cards in the station 40 become transferred to the station 48 after the information in the first vertical column on each card has been processed. By processing the information on successive columns of the cards as described in this paragraph, the transfer from the station 40 to the station 48 would not have to be made until all of the information in the successive vertical columns on each card has been processed.

The system of FIGURE 12 is similar in some respects to that of FIGURE 1, with an exception that the system of FIGURE 12 does not require a central drum.

The embodiment of FIGURE 12 includes a group of four rotatable vacuum pressure transporting drums which are indicated as 700, 702, 704 and 706 respectively. These drums are rotatably mounted on a table top, and are paired to provide positions of contiguity between the drums in each pair. That is, each drum of the group is contiguous to two of the other drums. Sufficient spacing is provided at the contiguous points of the drums to permit the cards transported by the drums to pass such contiguous points.

A reversible station 710 is associated with the drum 700, and this station may be constructed in a manner similar to the reversible stations described previously. In like manner, a plurality of reversible stations 712, 714 and 716 are respectively associated with the drums 702, 704 and 706.

A pair of gate transfer mechanisms 718 and 720 are positioned at the contiguous point between the drums 700 and 702. The gate 718 controls the transfer of cards from the drum 700 to the drum 702, and the gate 720 controls the transfer of cards from the drum 702 to the drum 700. A gate 722 is positioned at the contiguous point of the drums 702 and 704. When the gate 722 is activated it controls the transfer of cards from the drum 702 to the drum 704.

In like manner, a pair of gates 724 and 726 are respectively positioned at the respective contiguous points of the drums 706 and 700 and of the drums 706 and 704. The gate 724 controls the transfer of cards from the drum 706 to the drum 700, and the gate 726 controls the transfer of cards from the drum 704 to the drum 706. These gates may be similar in their construction to those described in the previous embodiment and shown in detail in FIGURE 3.

A first series of transducer heads 728 are positioned on the table top adjacent the drum 702, and these heads are located between the station 712 and the contiguous point of the drum 702 and the drum 704. Likewise, a series of transducer heads 730 are positioned on the table top adjacent the drum 706, and the transducer heads 730 are positioned between the station 716 and the contiguous point of the drums 700 and 706.

The drums 700, 702, 704 and 706 may be similar in their construction to the drums of the previous embodiment. These drums may have the same structural composition, for example, as the drum 16 shown in FIGURE 2. By way of illustration, the drums 700 and 704 may rotate in a counterclockwise direction and the drums 702 and 706 may rotate in a clockwise direction.

The control system of FIGURES 13a and 13b for actuating the apparatus of FIGURE 12 is similar in some respects to that of FIGURES 9a and 9b, and like elements in each system have been represented by like numerals.

In the control system of FIGURES 13a and 13b, the transducer head 730 schematically shown in FIGURE 12 may actually comprise a plurality of heads such as the heads 728a, 728b, 728c and 728d shown in FIGURE 13a. These latter heads scan the various rows of data on the cards 400 in exactly the same manner as the heads 66a, 66b, 66c and 66d of the previous embodiment. The heads 728a, 728b, 728c and 728d also are respectively connected to the "or" networks 401, 403, 405 and 407.

Also as in the control system of FIGURE 9, a signal passes through the "or" network 506 whenever the digit of second least significance is being processed on each card and whenever such digit has a value of "0," as represented by a pulse of high amplitude from the right output terminal of the flip-flop 438. However, the "or" network 506 passes a pulse whenever a card is being processed for the digits of least significance and third least significance and whenever such digits have values of "1." This is represented by pulses of high amplitudes on the left output terminals of the flip-flops 436 and 440. The output pulse produced by the "or" network 506 is delayed as before by the delay line 642 for an interval of time sufficient to bring the particular card producing it under the control of the instrumentality which is to be activated by the presence of such a pulse.

The control system of FIGURES 13a and 13b includes a manual starting switch 750. The armature of this switch is connected to the positive terminal of the source of direct voltage 510. The fixed contact of the start switch 750 is connected to a capacitor 752, and this capacitor is connected to a differentiator 754. The output signals from the differentiator 754 are applied to the left input terminal of the flip-flop 528 and through "or" networks to the right input terminals of the flip-flops 526 and 580.

The output terminal of the differentiator 754 is also connected to an "or" network 756. The output terminal of this "or" network is connected to the left input terminal of a flip-flop 758. The left output terminal of the flip-flop 758 is connected to the control grid of a triode 760. The cathode of this triode is grounded, and a resistor 762 is connected between its control grid and the negative terminal of the source 510.

An energizing winding 764 has one terminal connected to the anode of the triode 760, and the other terminal of this winding is connected to the positive terminal of the source 510. The winding 764 controls the reversible station 716, and this station is conditioned to a feeding mode whenever that winding is energized.

The output terminal of the differentiator 754 is also connected to an input terminal of an "or" network 768. The output terminal of this "or" network is connected to the left input terminal of a flip-flop 770. The left output terminal of the flip-flop 770 is connected to the control grid of a triode 772. This control grid is connected to a resistor 774 which, in turn, is connected to the negative terminal of the source 510. The cathode of the triode 772 is grounded, and the anode is connected to a winding 776 which is connected to the positive terminal of the source 510. The winding 776 controls the gate 724, and this gate is activated whenever that winding is energized.

The output terminal of the differentiator 754 is also connected to an input terminal of an "or" network 778. The output terminal of this "or" network is connected to the right input terminal of a flip-flop 780. The left output terminal of the flip-flop 780 is connected to the control grid of a triode 782. A resistor 784 is connected between that control grid and the negative terminal of the source 510. The cathode of the triode 782 is grounded, and the anode is connected to one terminal of an energizing winding 786. The other terminal of the energizing winding 786 is connected to the positive terminal of the source 510. The winding 786 controls the station 710, and that station is conditioned to a feeding mode when the winding is energized.

The output terminal of the differentiator 754 is also connected to an "or" network 788 and to an "or" network 790. The output terminal of the "or" network 788 is connected to the right input terminal of a flip-flop 792, and the output terminal of the "or" network 790 is connected to the right input terminal of a flip-flop 794.

The left output terminal of the flip-flop 792 is connected to the control grid of a triode 796. The cathode of this triode is grounded, and a resistor 798 is connected from its control grid to the negative terminal of the source 510. An energizing winding 800 is connected to the anode of the triode 796 and to the positive terminal of the source 510. The winding 800 controls the station 712, and this station is conditioned to a feeding mode when this winding is energized.

The left output terminal of the flip-flop 794 is connected to an input terminal of an "and" network 802, and the right output terminal of the flip-flop 794 is connected to an input terminal of an "and" network 804. The output terminal of the "and" network 802 is connected to an "or" network 806 and to the input terminal of a delay line 808. The output terminal of the "and" network 804, on the other hand, is connected to an "or" network 810 and to the input terminal of a delay line 812.

The output terminal of the "or" network 806 is connected to the left input terminal of a flip-flop 814, and the output terminal of the delay line 808 is connected to the right input terminal of this flip-flop. The output terminal of the "or" network 810 is connected to the left input terminal of a flip-flop 816, and the output terminal of the delay line 812 is connected to an "or" network 818 which is connected to the right input terminal of the flip-flop 816.

The left output terminal of the flip-flop 814 is connected to the control grid of a triode 820. The anode of this triode is connected to an energizing winding 822, and this winding is connected to the positive terminal of the source 510. A resistor 824 is connected from the control grid of the triode 820 to the negative terminal of the source 510, and the cathode of the triode 820 is grounded. The energizing winding 822 controls the gate 726, and this gate is activated whenever that winding is energized.

The left output terminal of the flip-flop 816 is connected to the control grid of a triode 826, this control grid being connected to a resistor 828. The resistor 828 is connected to the negative terminal of the source 510, and the cathode of the triode 826 is grounded. An energizing winding 830 is connected between the anode of the triode 826 and the positive terminal of the source 510. This winding controls the gate 718, and that gate is activated whenever the winding 830 is energized.

The output terminal of the delay line 642 is connected to each of the "and" networks 802 and 804.

The stations 710, 712, 714 and 716 are also equipped, like the stations in the previous embodiments, with armatures that close switch contacts when the last card leaves the respective stations. The station 716, for example, includes an armature 832 that closes with a pair of contacts 834 when the last card leaves that station. One of the contacts 834 is connected to the positive terminal of the source 510, and the other is connected to a capacitor 836. The capacitor 836 is connected to a differentiator 838 which, in turn, is connected to a delay line 840.

The output terminal of the delay line 840 is also connected to an input terminal of an "and" network 844. This "and" network has a second input terminal which is connected to the left output terminal of the flip-flop 580. An "and" network 845 is operatively controlled by signals from the delay line 840 and from the left output terminal of the flip-flop 528.

The output terminal of the "and" network 844 is connected to an input terminal of an "or" network 847 having another input terminal connected to the "and" network 845. A third input terminal of the "or" network 847 receives signals from an "and" network 875. The signals from the "or" network 847 pass to the left input terminal of a flip-flop 846 and through the "or" network 806 to the left input terminal of the flip-flop 814.

The left output terminal of the flip-flop 846 is connected to the control grid of a triode 848, the control grid being connected to a resistor 850. The resistor 850 is connected to the negative terminal of the source 510, and the cathode of the triode 848 is grounded. An energizing winding 852 is connected between the anode of the triode 848 and the positive terminal of the source 510. This energizing winding controls the station 714, and this station is conditioned to a feeding mode whenever the winding is energized.

An "and" network 842 receives signals at its input terminals from a delay line 896 and from the left output terminal of the flip-flop 528. The output terminal of the "and" network 842 is connected to the right input terminal of the flip-flop 758 and to the right input terminal of the flip-flop 770. Moreover, the output signals from the "and" network 842 are applied through "or" networks to the right input terminals of the flip-flops 528 and 580 and directly to the left input terminal of the flip-flop 526.

The output terminal of the "and" network 842 is also connected to an input terminal of an "or" network 854, and the output terminal of this "or" network is connected to the left input terminal of the flip-flop 792. The signals from the output terminal of the "and" network 842 are further applied to the left input terminal of the flip-flop 794, through an "or" network 849 to the right input terminal of the flip-flop 846 and through an "or" network 855 to the left input terminal of a flip-flop 856.

The left output terminal of the flip-flop 856 is connected to the control grid of a triode 858. The resistor 860 is connected between the control grid of this triode and the negative terminal of the source 510. The cathode of the triode 858 is grounded, and its anode is connected to an energizing winding 862. The other terminal of this energizing winding is connected to the positive terminal of the source 510. The energizing winding 862 controls the gate 722, and this gate is activated whenever that winding is energized.

When the last card leaves the station 712, an armature 864 engages a pair of contacts 866. One of the contacts 866 is connected to the positive terminal of the source 510, and the other of these contacts is connected to a capacitor 868. The capacitor 868 is connected to a differentiator 870 which, in turn, is connected to a delay line 872.

The delay line 872 is connected to input terminals of "and" networks 873 and 875 respectively having second input terminals connected to the left output terminal of the flip-flop 526 and the right output terminal of the flip-flop 898. The signals from the "and" network 873 are introduced to the left input terminal of the flip-flop 780 and through the "or" network 810 to the left input terminal of the flip-flop 816. The signals from the "and" network 875 are introduced through the "or" network 768 to the left input terminal of the flip-flop 770 and respectively through the "or" networks 818 and 847 to the right input terminal of the flip-flop 816 and the left input terminal of the flip-flop 846.

When the last card leaves the station 710, an armature 874 engages a pair of contacts 876. One of the contacts 876 is connected to the positive terminal of the source 510, and the other of these contacts is connected to a capacitor 878. The capacitor 878 is connected to a differentiator 880, and the output terminal of the differentiator is connected to a delay line 882.

The output terminal of the delay line 882 is connected to an input terminal of the "or" network 756 and to an input terminal of the "or" network 768. The output terminal of this delay line is also connected to the right input terminal of the flip-flop 526 and to the left input terminal of the flip-flop 580. The output terminal of the delay line 882 is additionally connected to respective input terminals of the "or" networks 818, 778, 790 and 788. The delay line 882 is further connected to the right input terminal of the flip-flop 856.

When the last card leaves the station 714, an armature 886 engages a pair of contacts 888 and 890. The contact 888 is connected to the positive terminal of the source 510, and the contact 890 is connected to an input terminal of an "and" network 891 having another input terminal connected to the left output terminal of the flip-flop 846. The output signals from the "and" network 891 are applied to a capacitor 892. The capacitor 892 is connected to a differentiator 894 which, in turn, is connected to a delay line 896. The delay line 896 is connected to the input terminals of the "and" network 842, the "or" network 854 and an "and" network 897. Another input terminal of the "and" network 897 receives signals from the left output terminal of the flip-flop 580. The signals from the "and" network 897 pass to the "or" networks 849 and 855.

The signals from the "and" network 897 are also applied to the right input terminal of the flip-flop 898 and the signals from the delay line 896 are applied to the left input terminal of the flip-flop 900. The left input terminal of the flip-flop 898 is connected to the output terminal of the differentiator 754, and the left output terminal of the flip-flop 898 is connected to each of the "and" networks 802 and 804.

The right input terminal of the flip-flop 900 is connected to the output terminal of the differentiator 754, and the left output terminal of this flip-flop is connected to the control grid of a triode 902. A resistor 904 is connected between the control grid of this triode and the negative terminal of the source 510, and the cathode of the triode is grounded. An energizing winding 906 is connected to the anode of the triode and to the positive terminal of the source 510. This winding controls the gate 720, and this gate is activated whenever the winding 906 is energized.

The cards to be sorted are initially placed in the station 716, and the selector 450 is adjusted as before for a particular vertical column on each card such as the first vertical column. Then, in a manner to be described, the cards are processed past the heads 730 in alternate passes and past the heads 728 in the other passes in such a manner that the bits of binary information of progressive digital significance are processed and the cards are sorted in accordance with this data. The processing of information continues until the cards have been completely sorted insofar as the data at the selected vertical column on each card is concerned.

To initiate the system, the switch 750 is momentarily closed and released. This causes the differentiator 754 to produce an output pulse, and this pulse triggers the flip-flop 528 to the true state so that only the "and" network 500 is conditioned for translation, and only data relating to the least significant bit in the selected vertical column on each card such as the first vertical column is able to pass to the "or" network 506. The pulse from the differentiator 754 is introduced to the right input terminals of the flip-flop 526 and 580 to trigger these flip-flops to the false states. Therefore, both the "and" networks 502 and 504 are rendered nonconductive, as is desired for the first pass.

The output pulse from the differentiator 754 is translated through the "or" network 756 to the left input terminal of the flip-flop 758 to trigger that flip-flop to a true state. This conditions the station 716 to the feeding mode so that the cards in that station are fed in succession to the periphery of the drum 706. Such cards are carried by the drum 706 in succession past the transducer heads 730a, 730b, 730c and 730d.

The output pulse from the differentiator 754 is also introduced through the "or" network 768 to the left input terminal of the flip-flop 770. This causes the flip-flop 770 to be triggered to a true state to activate the gate 724. Therefore, all of the cards transported past the heads 730 by the drum 706 are transferred by the gate 724 to the drum 700.

The output pulse from the differentiator 754 is also introduced to the "or" network 790 to the right input terminal of the flip-flop 794 to trigger that flip-flop to the false state. This conditions the "and" network 804, rather than the "and" network 802, for translation. Therefore, the output pulses from the delay line 642 are introduced through the "or" network 810 to the flip-flop 816. The flip-flop 898 is also triggered to its true state by the output pulse from the differentiator 754, so that the "and" network 804 is able to translate the output pulses from the delay line 642.

Therefore, each time a card having a value of "1" for the digit of least significance is processed by the heads 730, the resulting pulse from the delay line 642 causes a flip-flop 816 to be triggered to a true state. The flip-flop 816 becomes triggered true for a time sufficient to enable the card to be selected by the gate 718 and transferred to the drum 702. The length of time for activating the gate 718 is dependent upon the characteristics provided for the delay line 812. All other cards processed by the heads 730 and having values of "0" for the least significant digit are retained on the drum 700.

Because the output pulse from the differentiator 754 triggers both the flip-flops 780 and 792 to the false states, both of the stations 710 and 712 are conditioned to their stacking mode. Therefore, the cards having a value of "0" for the least significant digit are stacked in the station 710, and the cards having a value of "1" for the least significant digit are stacked in the station 712. The cards become stacked in this manner since the gate 718 becomes activated only for cards having a value of "1" for the least significant digit. This results from the connection of the left output terminal of the flip-flop 436 to an input terminal of the "and" network 500. The stacking of the cards in the stations 710 and 712 in accordance with the information representing the least significant digit may be seen from block II of FIGURE 14.

After the last card has left the station 716, and after a time interval sufficient to allow that card to become stacked in either the station 710 or in the station 712, the delay line 840 develops an output pulse. This pulse passes through the "and" network 845, which has previously become prepared for activation by the relatively high voltage on the left output terminal of the flip-flop 528. The pulse then passes through the "or" network 847 and triggers the flip-flop 846 to the true state. The pulse from the "and" network 845 also passes to the flip-flop 814 to trigger the flip-flop to the true state. In this way, any cards initially in the station 714 are able to travel through a proper path to become stacked in the stations 710 and 712 in accordance with the information on the cards. This will be seen from the subsequent discussion.

Initially, all of the cards may be in the station 716 and none of the cards may be in the station 714. This may be seen from block I of FIGURE 14. This causes a signal to pass through the "and" network 891 immediately after the flip-flop 846 becomes triggered to the true state. This signal is sharpened by the differentiator 894 and is introduced to the delay line 896. The output pulse from the "and" network 897 is introduced to the "and" network 842 and is passed by the "and" network because that "and" network is prepared for activation by the true state in the flip-flop 528. Therefore, the flip-flop 758 is triggered to a false state to place the station 716 in the stacking mode, and the flip-flop 770 is triggered to a false state to deactivate the gate 724. Also, the flip-flop 528 is triggered to a false state to close the "and" network 500, and the flip-flop 526 is triggered to a true state to condition the "and" network 502. In the manner described above, the control system is now ready for the second pass at which the binary bits of second least significance are sensed.

The output pulse from the "and" network 842 is also introduced through the "or" network 854 to the left input terminal of the flip-flop 792 to trigger that flip-flop to a true state. This places the station 712 in a feeding condition, so that its cards are fed in sequence to the periphery of the drum 702 to be carried by that drum past the heads 728a, 728b, 728c and 728d. Those heads now read the binary bits but only the bits of second least significance are able to be sensed and processed because of the operation of the selector 450 and the activation of the "and" network 502.

The output pulse from the "and" network 842 also triggers the flip-flop 794 to a true state. This causes the "and" network 802, rather than the "and" network 804, to be conductive. Therefore, the control pulses from the delay line 642 activate the gate 726, rather than the gate 718, when the cards have values of "0" for the digit of second least significance.

The output pulses from the "and" network 842 are introduced to the left input terminal of the flip-flop 856 to trigger that flip-flop to a true state. This activates the gate 722, so that all the cards processed by the transducer heads 728a, 728b, 728c and 728d are transferred to the drum 704. These cards are then transported by the drum to the gate 726. As noted above, only the cards having a value of "0" for the digits of second least significance activate the gate 726. Therefore, the cards having a value of "0" are transferred to the drum 706, and the cards having a value of "1" are retained on the drum 704. The output pulse from the "and" network 842 triggers both the flip-flop 846 and the flip-flop 758 to their false states, so that both the stations 714 and 716 become disposed in their stacking mode. Therefore, the cards having a value of "1" are transported with the drum 704 and are deposited in the station 714, and the cards having a value of "0" are transported with the drum 706 and are deposited in the station 716.

As the last card leaves the station 712, the armature 864 engages the contacts 866 to close the switch formed by these members. After that card has been suitably deposited, the delay line 872 develops an output pulse which passes through the "and" network 873 because of the simultaneous introduction of a high voltage from the left output terminal of the flip-flop 526. The signal from the "and" network 873 triggers the flip-flop 780 to the true state to condition the station 710 to the feeding mode. The signal from the "and" network 873 also passes through the "or" network 810 to trigger the flip-flop 816 to the true state and activate the gate 718. Therefore, all of the cards in the station 710 are fed in sequence to the drum 700, and these cards are carried by that drum to the activated gate 718. This gate transfers the cards to the drum 702, and the latter drum carries the cards past the heads 728a, 728b, 728c and 728d. As before, suitable control effects are set up so that the cards having a value of "1" are deposited in the station 714 and the cards having a value of "0" are deposited in the station 716. The stacking of the cards in the stations 714 and 716 in accordance with the information representing the second least significant digit may be seen from block III of FIGURE 14.

The third pass is initiated by the last card leaving the station 710 and after a delay suitable to enable that card to be deposited in either the station 714 or in the station 716. Then, because the armature 874 has closed on its contacts 876, the delay line 882 generates an output pulse. This output pulse from the delay line 882 is introduced through the "or" network 756 to the left input terminal of the flip-flop 846 to condition the station 716 to its feeding mode. Therefore, the cards in the station 716 are fed in sequence to the periphery of the drum 706 to be transported by that drum to the heads 730.

The output pulse from the delay line 882 is also applied to the left input terminal of the flip-flop 580 and to the right input terminal of the flip-flop 526. This conditions the "and" network 504 for translation, so that the binary bits of third least significance on the cards are now sensed and processed.

The pulse from the delay line 882 is also introduced through the "or" network 768 to the flip-flop 770 to activate the gate 724. Therefore, the cards become transferred to the drum 700 by the activated gate 724 after the information on the cards has been read by the heads 730a to 730d, inclusive.

The output pulse from the delay line 882 is translated by the "or" network 818 to the right input terminal of the flip-flop 816 to deactivate the gate 718, and the pulse is translated through the "or" network 884 to the right input terminal of the flip-flop 856 to deactivate the gate 722.

The output pulse from the delay line 882 is also translated through the "or" network 790 to the right input terminal of the flip-flop 794. This returns the flip-flop 794 to the false state, so that the "and" network 804, rather than the "and" network 802, becomes conditioned for translation. This causes the output pulses from the delay line 642 to control the gate 718, rather than the gate 726, as described above.

The output pulse from the delay line 882 is also introduced through the "or" network 788 to the right input terminal of the flip-flop 792 so that the station 712 is conditioned to its stacking mode, and this output pulse is introduced through the "or" network 778 to the right input terminal of the flip-flop 780 to condition the station 710 to its stacking mode. Therefore, in the manner described above, the cards having a value of "0" for the digits of third least significance are deposited in the station 710 and the cards having a value of "1" for the digits of third least significance are deposited in the station 712. This results from the connection of the left output terminal of the flip-flop 440 to the input terminal of the "and" network 504.

After the last card leaves the station 716, the armature 832 again engages the contacts 834 and after an appropriate time interval, the delay line 840 develops an output pulse. However, the "and" network 845 is not in a condition for conduction because the flip-flop 528 is now in its false state. Therefore, the output pulse from the delay line 840 actuates only the flip-flop 846, this pulse being translated by the "and" network 844 which is conditioned for conduction by the flip-flop 580 which is now in its true state. Therefore, the flip-flop 846 and the flip-flop 814 are triggered to their true states to activate the gate 726 and to control the station 714 to its feeding mode.

Therefore, the cards in the station 714 are fed in sequence to the drum 704 and are carried by that drum to the activated gate 726. This gate causes the cards to be transferred in sequence to the drum 706 and they are carried by the latter drum under the empty stack 716 and past the transducer heads 730a, 730b, 730c, and 730d. Then, and as was the case with the cards from the station 716, the cards having a value of "0" for the third least significant digit are deposited in the station 710 whereas the cards having a value of "1" for the least significant digit are deposited in the station 712. This results from the connection of the left output terminal of the flip-flop 440 to the input terminal of the "and" network 504. The stacking of the cards in the stations 710 and 712 in accordance with the information representing the third least significant digit may be seen from block IV of FIGURE 14.

As was the case with the previous embodiment, it remains now only to transfer the cards from the station 712 to the station 710. As a first step, all of the cards from the station 712 are transferred to the station 714 to invert the order of the cards. The cards then become transferred from the station 714 to the station 710. All the cards will then appear in the station 710 in proper order with respect to the binary data at the selected position of the cards. This last transfer is accomplished in the following manner:

As the last card leaves the station 714, and after a time interval sufficient to enable that card to be suitably deposited in one or the other of the stations 710 and 712, the delay line 896 develops an output pulse, and this output pulse is introduced to the left input terminal of the flip-flop 792 through the "or" network 854. The pulse triggers the flip-flop 792 to a true state and conditions the station 712 to a feeding mode. The pulse from the delay line 896 is also introduced to the "and" network 897, which passes the pulse because of its previous preparation for activation by the relatively high voltage on the left output terminal of the flip-flop 580. The pulse from the "and" network 897 is introduced to the right input terminal of the flip-flop 898 to trigger the flip-flop to a false state. This causes both the "and" networks 804 and 802 to be conditionsd to a nonconductive state, so that the output pulses from the delay line 642 due to the reading of the cards by the heads 728a, 728b, 728c and 728d and by the heads 730a, 730b, 730c and 730d during this last pass are ineffective.

The pulse from the "and" network 897 is introduced through the "or" network 855 to the flip-flop 856 to trigger the flip-flop to the true state. This causes the flip-flop 856 to be triggered to the true state so that the gate 722 becomes activated for transferring the cards from the drum 702 to the drum 704. At the same time, the pulse from the "and" network 897 is introduced through the "or" network 849 to the right input terminal of the flip-flop 846. This triggers the flip-flop 846 to the false state so that the station 714 becomes disposed in the stacking mode. In this way, all of the cards from the station 712 become deposited in the station 714 in inverse order. This may be seen by comparing blocks IV and V of FIGURE 14.

After the last card has moved out of the station 712, a signal passes through the "and" network 875 because of the simultaneous introduction to the "and" network of a relatively high voltage from the right output terminal of the flip-flop 898. The signal from the "and" network 857 passes through the "or" networks 847 and 806 and triggers the flip-flops 846 and 814 to the true states. This causes the station 714 to become disposed in the feeding mode so that cards in the station become transferred sequentially to the drum 704. It also causes the gate 726 to become activated for transferring the cards from the drum 704 to the drum 706.

The signal from the "and" network 875 also passes through the "or" network 768 and triggers the flip-flop 770 to the true state. In this way, the gate 724 becomes activated to transfer the cards from the drum 706 to the drum 700. The cards move with the drum 700 past the gate 718 since the gate becomes deactivated by the introduction of a signal from the "and" network 875 to the right input terminal of the flip-flop 816. The cards then become deposited in the station 710 because of the previous disposition of the station in the stacking mode. The cards become stacked in an order of progressive significance, as may be seen from block VI of FIGURE 14.

Therefore, and as indicated above, the cards now appear in the station 710 in a fully sorted condition in accordance with the binary data at a selected position on the cards. To continue the sorting, the cards are then transferred to the station 716, and the selector 450 is adjusted to select a different position on each card. The sorting process is then repeated. Actually, the selector 450 may also be advanced automatically to select a second column on each card after the information in the first column has been completely processed. This has been described in some detail with respect to the embodiment shown in FIGURES 1 to 9, inclusive.

It will be seen, that the embodiment of FIGURE 12 is similar in many respects to that of FIGURE 1. However, the latter embodiment achieves the same desirable result but with fewer components. Specifically, no central transporting drum is required in the latter embodiment, and the electronic control system is simplified.

The invention provides, therefore, an improved system and apparatus which is capable of rapidly, efficiently and accurately processing a stack of information cards with respect to the binary data recorded on individual ones of such cards. It will be appreciated that although the systems described in the specification deal with the cards so that a sorting function is obtained, the described principles and concepts can be used in analogous systems to collate, merge or otherwise process the information cards. Actually, merging operations are also performed by the embodiment shown in the drawings and described previously as may be seen by comparing blocks IV, V and VI in FIGURE 14.

It should be appreciated that certain circuits are shown only by way of illustration and that a number of different circuits are available and are known to persons skilled in the art. This would include the starting circuit such as the switch 750, the capacitance 752 and the differentiator 754. It would also include circuitry such as the binary counter 416, the selector 450 and the compare network 448 shown in block form in FIGURES 9A and 13B and in some detail in FIGURE 10 as one form of embodiment. It should be appreciated that the term "transport means" is intended to include drums as well as other types of conveyors for the cards. It should also be appreciated that the term "cards" is intended to include any type of discrete elements capable of storing a plurality of bits of information and subsequently having such bits of information reproduced.

Although this application has been disclosed and illustrated with reference to particular applications, the principles involved are susceptible of numerous other applications which will be apparent to persons skilled in the art. The invention is, therefore, to be limited only as indicated by the scope of the appended claims.

We claim:

1. In a system for processing information cards each having a plurality of bits of information recorded on the cards, the combination of: means including a plurality of rotatabled rums disposed in paired relationship for maintaining cards in fixed position on the drums during the drum rotation; means including gate means for obtaining a controlled transfer of cards from one of the drums in each paired relationship to the other drum in the paired relationship; means including a plurality of stations disposed in coupled relationship to the drums and including a plurality of reversible control means each associated with a different station for obtaining a transfer of cards from the associated station to the drums in one relationship of the control means and for obtaining a transfer of cards from the drums to the station in a second relationship of the control means; transducing means disposed in coupled relationship to the cards on the drums for processing information on the cards moving with the drums; means including electrical circuitry for operating on the reversible control means to obtain a transfer of cards to the drums from a first pair of stations in the plurality for processing of information of particular significance on the cards and to obtain a transfer of the cards to a second pair of stations in the plurality in accordance with the processed information and to obtain a transfer of cards to the drums from successive pairs of stations in the plurality for processing of information of progressive significance on the cards and to obtain a transfer of the cards from the drums to next successive pairs of stations in the plurality in accordance with the processed information; and means including electrical circuitry for operating on the gate means to obtain a transfer of cards between successive pairs of drums in the plurality in accordance with the information processed on the cards.

2. In a system for processing information cards each having a plurality of bits of information recorded on the card, means including a plurality of transport means for providing a movement of cards in accordance with the movement of the transport means, the transport means being disposed in paired and spaced relationship to facilitate a transfer of cards between the transport means in each pair, means including a plurality of gate means each disposed between a different pair of the transport means in the plurality and each operative in a first relationship to provide for a transfer of cards from one of the transport means in the pair to the other transport means and each operative in a second relationship to obtain a movement of cards with one of the transport means in the pair past the position of transfer to the other transport means in the pair, a plurality of stations for holding information cards, means including reversible control means each disposed relative to an individual one of the stations in the plurality and to an individual one of the transport means in the plurality and each constructed to obtain a transfer of cards from the station to the individual transport means in one operative relationship of the reversible station and to obtain a transfer of cards from the transport means to the individual station in the second operative relationship of the control means, transducing means disposed relative to the cards on the transport means for processing information on cards transferred to the transport means from the station, and means including electrical circuitry for obtaining a controlled operation of the different gate means and the reversible control means in different patterns of the first and second relationships in successive passes of the information cards to obtain a movement of cards between successive pairs of stations in the plurality in the successive passes and to obtain the separation of the cards in each pass between the pair of stations receiving the cards in that pass in accordance with the information representing progressive information on the cards relative to the information processed in the previous pass and to obtain the use of the stations receiving the cards in each pass as the stations transferring the cards to the successive pair of stations in the next pass.

3. In a system for processing information cards each having a plurality of bits of information on the card, means including a plurality of transport means movable in closed loops and constructed to provide a movement of cards in accordance with the movement of the transport means, the transport means being disposed in paired relationship to facilitate a transfer of cards between the transport means in each pair, means including a plurality of gate means each disposed between a different pair of the transport means in the plurality and each operative in a first relationship to provide for a transfer of cards from one of the transport means in the pair to the other transport means and each operative in a second relationship to obtain a movement of cards with one of the transport means in the pair past the position of transfer to the other transport means in the pair for a movement of the cards in different paths in accordance with the operation of the gate means in the first and second relationships, means including a first pair of stations each constructed to hold information cards and including a first pair of reversible control means each disposed relative to a different one of the stations in the pair and a different one of the transport means in the plurality and constructed to obtain a transfer of cards from the associated station to the associated transport means in one operative relationship of the reversible control means and constructed to obtain a transfer of cards from the associated transport means to the associated station in a second operative relationship of the reversible control means, means including a second pair of stations each constructed to hold information cards and including a second pair of reversible control means each disposed relative to a different one of the stations in the pair and a different one of the transport means in the plurality and constructed to obtain a transfer of cards from the associated station to the associated transport means in one operative relationship of the reversible station and to obtain a transfer of cards from the associated transport means to the associated station in a second operative relationship of the control means, means including transducing means disposed relative to the cards on the transport means for processing information on the cards transferred to the transport means, and means including electrical circuitry operatively coupled to the processing means for obtaining an operation of different ones of the gate means and the reversible control means in the first and second relationships in accordance with the processed information on the cards to obtain a movement of the cards in the successive passes between each pair of stations and the other pair of stations and to obtain a movement of the cards to one or the other of the stations in the pair in each pass in accordance with the information processed on the cards in that pass and the different paths of movement of the cards.

4. In a system for processing information cards each having a plurality of bits of information recorded on the card wherein the bits have first signal characteristics to represent a binary zero and have second signal characteristics to represent a binary one, the combination of: a central rotatable transporting drum; means including first and second transducer means positioned adjacent the periphery of said central drum for processing cards transported by said drum and for processing information of progressive significance on the cards in successive passes; a first pair of auxiliary rotatable transporting drums positioned adjacent said central drum on one side of said central drum between said first and second transducer means; a first pair of card holders respectively positioned adjacent respective ones of said auxiliary drums and each of said card holders including reversible transfer means for obtaining a transfer of cards to said associated auxiliary drum from said card holder in a first operative relationship of the reversible means and for obtaining a transfer of cards to said card holder from said associated auxiliary drum in a second operative relationship of the reversible means; first gate means for controlling the transfer of cards between said central drum and respective ones of said auxiliary drums; a second pair of auxiliary rotatable transporting drums positioned adjacent said central drum on the other side of said central drum between said first and second transducer means; a second pair of card holders respectively positioned adjacent respective ones of said second pair of auxiliary drums, and each of said second pair of card holders including a transfer means for obtaining a transfer of cards to said associated auxiliary drum from said card holder in a first operative relationship of the reversible means and for obtaining a transfer of cards to said card holder from said associated auxiliary drum in a second operative relationship of the reversible means; second gate means for controlling the transfer of cards between said central drum and respective ones of said second pair of auxiliary drums; means including the central drum and the first and second pairs of auxiliary drums for producing a vacuum pressure at the periphery of the drums to retain the cards in fixed positions on the peripheries of the drums during the drum rotations; means including electrical circuitry coupled to said processing means for operating on said first and second gate means and said reversible transfer means to obtain the transfer of cards in alternate passes from the first pair of card holders to the second pair of card holders and to obtain the transfer of cards in the other passes from the second pair of card holders to the first pair of card holders and to obtain the transfer of cards to a particular one of the receiving holders in each pass in accordance with the processing of cards having zero bits and to obtain the transfer of cards to the other card holder in the receiving pair in each pass in accordance with the processing of cards having unity bits.

5. In a system for processing information cards, the combination of: a plurality of rotatable vacuum pressure transporting drums positioned adjacent one another; gate means disposed relative to the drums and constructed to obtain a controlled transfer of cards between respective ones of said drums; a plurality of card holders positioned in cooperative relationship with respect to individual ones of said drums; and constructed to hold the cards in stacked relationship; a plurality of transfer means each disposed in co-operative relationship with an associated card holder in the plurality and an associated drum in the plurality and having a feeding state of operation for obtaining a transfer of cards to the associated drum from the associated card holder and having a stacking state of operation for obtaining a transfer of cards from the associated drum; control means operatively coupled to the transfer means for conditioning successive pairs of transfer means to the stacking state of operation for successive cycles of operation of the system; further control means operatively coupled to the gate means for actuating said gate means in each cycle of operation to cause the card holders associated with the transfer means in the stacking state to receive in such successive cycles cards having binary bits recorded thereon at successive levels of significance, with cards representing zero bits being deposited in one of said card holders of each such pair and with cards representing unity bits being deposited in the other of said card holders of each such pair; and further control means operatively coupled to the transfer means for conditioning at the end of each such cycle the transfer means in the stacking stage to the feeding state to obtain a transfer of the cards to the transporting drums from the associated card holders for transport of such cards to the next successive pair of said card holders.

6. In a system for processing information cards, the combination of: a group of four rotatable vacuum pressure transporting drums positioned adjacent one another; a plurality of individual gate mechanisms interposed between respective ones of said drums for controlling the transfer of cards between said drums; a first transducer means positioned adjacent one of said drums for processing cards transported thereby; a second transducer means positioned adjacent a second of said drums for processing cards transported thereby; a group of four card holders positioned adjacent respective ones of said drums, a group of four transfer means disposed in co-operative relationship with a different one of the card holders and the drums and each having a feeding state of operation for obtaining a transfer of cards to the associated drum from the associated card holder and having a stacking state of operation for removing cards from the associated drum; control means operatively coupled to the transfer means for conditioning successive pairs of transfer means to the stacking state in successive cycles of operation of the system; further control means operatively coupled to said first and second transducer means for actuating selected ones of said gate mechanisms to cause the pairs of card holders in the stacking state to receive in such successive cycles cards having binary bits recorded thereon at successive levels of significance, with cards having zero bits being deposited in one of said card holders of each such pair and with cards having unity bits being deposited in the other of said card holders of each such pair; and further control means operatively coupled to the transfer means for subsequently conditioning at the end of each such cycle the transfer means in the stacking state during that cycle to the feeding state to obtain a transfer of the cards in the associated card holders to the transporting drums associated with such card holders for transport of such cards, and for controlling said gate means to cause such cards to be transported past one of said first and second transducer means to the next successive pair of said card holders.

7. In a system for processing a plurality of information cards each having a plurality of bits of signal information recorded on the cards, the combination of: a plurality of transport means each constructed to provide a transport of the cards, the transport means being disposed in paired and spaced relationship to one another to facilitate a transfer of particular cards between the transport means in the pairs and to provide for a transport of other cards on one of the transport means in each pair past the position of transfer to the other transport means in the pair, a plurality of stations each constructed to hold a plurality of cards and each disposed relative to a different one of the transport means in the plurality to provide a transfer of cards between the station and the associated transport means, a plurality of gates disposed between different pairs of the transport means in the plurality to obtain a transfer of cards between the transport means in each pair in a first relationship and to provide for a movement of the cards past the position of transfer between the transport means in the pair in a second operative relationship, a reversible station means each disposed relative to the different stations and to a particular one of the transport means in the plurality to obtain a transfer of cards into the associated station from the associated transport means in one operative relationship and to provide a controlled transfer of cards from the associated station to the associated transport means in a second operative relationship, means disposed relative to the cards on the transport means for processing particular information on the transported cards in each transport of the cards and for processing progressive information on the cards in successive passes of the cards, means operatively coupled to the reversible station means for obtaining an operation of particular station means in the plurality in the first operative relationship and other station means in the plurality in the second operative relationship in alternate passes of the cards and for reversing the operative relationship of the reversible station means in the other passes, and means operatively coupled to the gating means in the plurality for obtaining an operation of individual ones of the gating means in the first and second relationships in accordance with the information processed on the cards and in accordance with the disposition of the different reversible station means in the plurality in the first and second operative relationships to control the paths of movement of the cards on the transport means.

8. In a system for processing a plurality of information cards each having a plurality of bits of signal information recorded on the cards, the combination of: a plurality of transport means each constructed to provide a transport of the cards and disposed in paired relationship to at least one of the other transport means in the plurality to provide a transfer of cards between the paired transport means, means including a plurality of gate means disposed between the paired transport means in the plurality and operative in one relationship to obtain a controlled transfer of cards between the paired transport means and operative in a second relationship to obtain a transport of the cards on one of the paired transport means past the position of transfer to the other one of the paired transport means, a plurality of card stations disposed relative to the cards on the transport means to obtain a transfer of cards between the card stations and the transport means, reversible station means disposed relative to the different stations in the plurality and different ones of the transport means and operative in one relationship to obtain a controlled transfer of cards from the associated stations to the associated transport means and operative in a second relationship to obtain a transfer of cards from the associated transport means to the associated stations, means including electrical circuitry operatively coupled to the reversible station means to obtain in alternate passes the operation of particular reversible station means in the first relationship and the operation of the other reversible station means in the plurality in the other relationship for a transfer of cards from the particular stations to the other stations and to obtain in the other passes the operation of the other reversible station means in the first relationship and the operation of the particular reversible station means in the second relationship for a transfer of the cards from the other stations to the particular stations, means including transducing means and including electrical circuitry coupled to the transducing means for processing progressive information on the transported cards in the successive passes of the cards, and means including electrical circuitry responsive to the information processed on the cards in each particular pass for obtaining a controlled operation of the gating means in the plurality in the first and second relationships in accordance with the particular pass and with the information processed on the cards to control the paths of movement of the cards and to obtain a transfer of the cards to controlled stations in the plurality.

9. In a system for processing a plurality of information cards each having a plurality of bits of signal information recorded on the cards, the combination of: first, second, third and fourth transport means each constructed to provide a transport of the cards and disposed in paired relationship to at least one of the other transport means to provide a transfer of cards between the paired transport means; means including a plurality of gate means disposed between the pairs of the first, second, third and fourth transport means and operative upon activation to obtain a controlled transfer of cards between the paired transport means and disposed to provide for a movement of cards past the position of transfer from one of the paired transport means to the other paired transport means upon a lack of activation of the gate means such that the cards are transported in different paths in accordance with the activation or lack of activation of the different gate means in the plurality; first, second, third and fourth card holders respectively disposed relative to the first, second, third and fourth transport means to obtain a transfer of cards between the associated card holders and transport means; first, second, third and fourth reversible station means respectively disposed in co-operative relationship to the first, second, third and fourth card holders and the first, second, third and fourth transport means and each operative in a first relationship to obtain a controlled transfer of cards from the associated card holder to the associated transport means and operative in a second relationship to obtain a transfer of cards from the associated transport means to the associated card holder, means including electrical circuitry operatively coupled to the first, second, third and fourth reversible station means to obtain in alternate passes an operation of the first and second reversible station means in the first relationship and an operation of the third and fourth reversible station means in the second relationship for a transfer of cards from the first and second card holders to the third and fourth stations and to obtain in the other passes an operation of the third and fourth reversible station means in the first relationship and an operation of the first and second reversible station means in the second relationship for a transfer of the cards from the third and fourth card holders to the first and second stations, means including transducing means and including electrical circuitry operatively coupled to the transducing means for processing progressive information on the transported cards in the successive passes of the cards, and means including electrical circuitry responsive to the information processed on the cards in each particular pass for obtaining a controlled activation of only particular gating means in the plurality in accordance with the information processed on the cards for a controlled movement of the cards in different paths in accordance with the particular gating means activated and for a transfer of the cards to particular ones of the third and fourth card holders in the alternate passes and to particular ones of the first and second card holders in the other passes.

10. The system set forth in claim 8 in which each of the transport means in the plurality is movable in a closed loop.

11. The system set forth in claim 9 in which fifth transport means are disposed relative to the first, second, third and fourth transport means to provide a transfer of cards between the fifth transport means and different ones of the first, second, third and fourth transport means and in which particular gate means are included in the plurality and are operative upon activation to obtain a controlled transfer of cards between the fifth transport means and the first, second, third and fourth transport means.

12. In a system for processing information cards each having a plurality of bits of information recorded on the card wherein the bits have first signal characteristics to represent a binary zero and have second signal characteristics to represent a binary one, the combination of: means including a central vacuum pressure rotatable transporting drum for holding the cards in fixed position on the drum during the drum rotation; transducer means positioned adjacent the periphery of said drum for processing cards transported thereby; means including a plurality of card holders and including transfer mechanisms coupled to the card holders for obtaining a transfer of cards from said card holder to said central drum and for obtaining a transfer of cards from said drum to said card holders; control means coupled to said transducer means for causing successive pairs of transfer mechanisms to deposit in the coupled card holders in successive passes cards having binary bits recorded thereon at progressive levels of significance, with the cards having zero binary bits being deposited in one of said card holders of each such pair and with the cards having unity binary bits being deposited in the other of said card holders of each such pair; and further control means for causing at the end of each such pass the transfer mechanisms of the pair of said card holders receiving cards in that particular pass to feed the cards therein in sequence to said drum for transportation by the central drum past the transducing means for the processing of further information on the cards and for the deposit of the cards in the next successive pair of said card holders in accordance with such processed information; each said transfer mechanism including an auxiliary rotatable vacuum pressure transporting drum positioned adjacent said central drum to hold the cards in fixed position during the rotation of said auxiliary drum and each of said transfer mechanisms further including gate means for controlling the transfer of cards between said auxiliary drum and said central drum.

13. In a system for processing information cards each having a plurality of bits of information recorded on the card wherein the bits have first signal characteristics to represent a binary zero and have second signal characteristics to represent a binary one, the combination of: means including a central vacuum pressure rotatable transporting drum for holding the cards in fixed position on the drum during the drum rotation; transducer means positioned adjacent the periphery of said drum for processing cards transported thereby; means including a plurality of card holders and including transfer mechanisms coupled to the card holders for obtaining a tarnsfer of cards from said card holders to said central drum and for obtaining a transfer of cards from said drum to said card holders; control means coupled to said transducer means for causing successive pairs of transfer mechanisms to deposit in the coupled card holders in successive passes cards having binary bits recorded thereon at progressive levels of significance, with the cards having zero binary bits being deposited in one of said card holders of each such pair and with the cards having unity binary bits being deposited in the other of said card holders of each such pair; and further control means for causing at the end of each such pass the transfer mechanisms of the pair of said card holders receiving cards in that particular pass to feed the cards therein in sequence to said drum for transportation by the central drum past the transducing means for the processing of further information on the cards and for the deposit of the cards in the next successive pair of said card holders in accordance with such processed information, each of said transfer mechanisms including an auxiliary rotating vacuum pressure transporting drum positioned adjacent the central drum to hold the cards in fixed position during the rotation of the auxiliary drum and each of said transfer mechanisms further including gate means for controlling the transfer of cards between said auxiliary drum and said central drum.

14. In a system for processing information cards each having a plurality of bits of information recorded on the card, the combination of: transporting means constructed to obtain a movement of the cards in divergent paths on the transport means; a plurality of pairs of reversible means each disposed relative to the transporting means and constructed to obtain a transfer of cards to the transporting means in a first operative relationship and to receive cards from the transporting means in a second operative relationship; means operative upon a particular one of the reversible means of a first one of the pairs to obtain a transfer of cards to the transporting means; means responsive to particular information on the cards transferred to the transport means for obtaining a transport of the cards in the divergent paths on the transport means in accordance with such particular information; control means initially operative upon the reversible means of the second one of the pairs to obtain an individual selection of different ones of such cards by said reversible means from the transporting means in accordance with the movement of the cards in the divergent paths and subsequently operative upon the reversible means of such second pair to obtain a sequential return of the cards to the transporting means from said reversible means; and further control means operative upon said reversible means of the first one of the pairs to obtain an individual transfer of different ones of the cards from the transporting means to the reversible means in the first pair in accordance with the different paths of movement of the cards.

15. In a system for processing information cards each having a plurality of bits of information recorded on the card, a combination of: transporting means constructed to obtain a movement of the cards in divergent paths on the transport means; first and second pairs of stations each constructed to hold the cards in stacked relationship; first and second pairs of reversible means each disposed relative to a different one of the transport means and each constructed to obtain a transfer of cards to the transporting means and to receive cards from the transporting means; means operative upon a particular one of the reversible means of the first pair to obtain a transfer of cards to the transporting means from the station associated with the particular one of the reversible means; transducing means disposed relative to the cards on the transporting means for processing information on the cards transferred to the transporting means; means responsive to the information processed by the transducing means for obtaining a movement of the cards in the divergent paths on the transport means in accordance with such processed information; control means initially operative upon each of the reversible means of the second pair to obtain an individual transfer of different ones of such cards from the transporting means to the stations in the second pair in accordance with the divergent paths of movement of the cards on the transport means and subsequently operative upon the reversible means of the second pair to obtain a sequential return of the cards to the transporting means from one of the stations in the second pair for the further processing of information on the cards and subsequently to obtain a sequential return of the cards to the transporting means from the other station in the second pair for the further processing of information on the cards; and further control means operative upon the reversible means of the first pair to obtain an individual transfer of different ones of the cards from the transporting means to the stations in the first pair in accordance with the divergent paths of movement of the cards on the transport means.

16. In a system for processing information cards each having a plurality of bits of information recorded in binary form on the card wherein the bits have first signal characteristics to represent a binary one and have second signal characteristics to represent a binary zero, the combination of: transporting means constructed to obtain a movement of the cards in divergent paths on the transport means; first and second pairs of stations each constructed to hold the cards in stacked relationship; first and second pairs of reversible means each disposed relative to the transporting means and to a different one of the stations and each constructed to obtain a transfer of cards to the transporting means from the associated station in a first operative relationship and to obtain a transfer of cards from the transporting means to the associated station in a second operative relationship; transducing means disposed relative to the transporting means for processing progressive information on the cards transferred to the transporting means in successive passes of the cards; means responsive to the information processed by the transducing means for obtaining a transport of the cards in the divergent paths on the transport means in accordance with such processed information; control means operative upon successive pairs of the reversible means in successive passes of the cards to obtain a transfer to the associated stations of cards having binary bits recorded on the cards at progressive levels of significance and to obtain the transfer of the cards to the different stations in the pairs in accordance with the divergent paths of movements of the cards on the transport means, with cards having zero binary bits being deposited in one of the reversible means of each such pair, and with cards having unity binary bits being deposited in the other of the reversible means of each such pair; and further control means operative at the termination of each pass upon the pair of the reversible means in the second operative relationship to convert the reversible means to the first operative relationship for producing a transfer of the cards sequentially to the transporting means from the associated stations and further processing of the binary information on the cards and for movement of the cards by the transporting means in the divergent paths on the transport means to the other pair of the reversible means in accordance with the information processed on the cards; and control means operative at the termination of each pass upon the other pair of the reversible means to obtain an operation of such reversible means in the second relationship for a transfer of the cards from the transporting means to the associated stations in accordance with the divergent paths of movement of the cards on the transport means.

17. In a system for processing information cards each having a plurality of bits of information recorded on the cards, transport means constructed to obtain a movement of the cards in divergent paths on the transport means, means including at least a first pair of card stations and including a first pair of reversible control means associated with the stations and disposed relative to the transport means and to the stations and constructed to obtain a transfer of cards from the stations to the transport means at particular times and to obtain a transfer of cards from the transport means to the stations at other times, means including at least a second pair of card stations and including a second pair of reversible control means associated with the second pair of stations and disposed relative to the transport means and to the associated stations and constructed to obtain a transfer of cards from the station to the transport means at particular times and to obtain a transfer of cards from the transport means to the station at other times, transducing means disposed relative to the cards on the transport means for processing information on cards transferred to the transport means, means including electrical circuitry operatively coupled to the transducing means for obtaining a transport of the cards in divergent paths on the transport means in accordance with the information processed on the cards, means including electrical circuitry operatively coupled to the transducing means for operating on the first pair of reversible control means to obtain a transfer of cards from the first pair of card stations to the transport means for the processing of information of first particular significance on the cards and for operating on the second pair of reversible control means to obtain a transfer of selected cards from the transport means to the stations in the second pair in accordance with the divergent paths of movement of the cards on the transport means, and means including electrical circuitry operatively coupled to the transducing means for operating on the second pair of reversible control means to obtain a transfer of the selected cards from the second pair of stations to the transport means for the processing of information of second particular signincance on the cards and for operating on the first pair of reversible control means to obtain a transfer of particular ones of the selected cards to one of the stations in the pair and a transfer of the other ones of the selected cards to the other station in the pair in accordance with the movements of the cards in the divergent paths on the transport means.

References Cited in the file of this patent

UNITED STATES PATENTS 2,795,328    Tyler et al. _____ June 11, 1957